(12) United States Patent
Taniguchi et al.

(10) Patent No.: US 10,587,831 B2
(45) Date of Patent: Mar. 10, 2020

(54) SOLID-STATE IMAGING DEVICE, IMAGING SYSTEM, AND MOVING BODY

(71) Applicant: CANON KABUSHIKI KAISHA, Tokyo (JP)

(72) Inventors: Hiroaki Taniguchi, Kawasaki (JP); Noriyuki Shikina, Hachioji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 6 days.

(21) Appl. No.: 16/112,210

(22) Filed: Aug. 24, 2018

(65) Prior Publication Data

US 2019/0068910 A1 Feb. 28, 2019

(30) Foreign Application Priority Data

Aug. 31, 2017 (JP) ................. 2017-167254

(51) Int. Cl.
| | |
|---|---|
| *H04N 5/3745* | (2011.01) |
| *H04N 5/232* | (2006.01) |
| *H04N 5/341* | (2011.01) |
| *H04N 5/347* | (2011.01) |
| *H04N 5/378* | (2011.01) |

(52) U.S. Cl.
CPC ......... *H04N 5/37455* (2013.01); *H04N 5/232* (2013.01); *H04N 5/23212* (2013.01); *H04N 5/232122* (2018.08); *H04N 5/341* (2013.01); *H04N 5/347* (2013.01); *H04N 5/378* (2013.01); *H04N 5/3745* (2013.01); *H04N 5/37457* (2013.01)

(58) Field of Classification Search
CPC ......... H04N 5/37455; H04N 5/232122; H04N 5/232; H04N 5/23212; H04N 5/341; H04N 5/347; H04N 5/3745; H04N 5/37457; H04N 5/378

USPC ........................................................ 348/308
See application file for complete search history.

(56) References Cited

U.S. PATENT DOCUMENTS

| | | | | |
|---|---|---|---|---|
| 8,154,639 | B2 * | 4/2012 | Kato | H04N 5/3575 |
| | | | | 250/208.1 |
| 9,332,202 | B2 * | 5/2016 | Totsuka | H04N 5/37455 |
| 9,602,753 | B2 * | 3/2017 | Saito | H03M 1/34 |
| 9,609,257 | B2 * | 3/2017 | Tanaka | H04N 5/369 |
| 9,762,836 | B2 * | 9/2017 | Kurose | H01L 25/18 |
| 10,003,761 | B2 * | 6/2018 | Totsuka | H04N 5/37455 |

(Continued)

FOREIGN PATENT DOCUMENTS

JP   2013-211833 A   10/2013

*Primary Examiner* — Pritham D Prabhakher
(74) *Attorney, Agent, or Firm* — Canon U.S.A., Inc. IP Division

(57) ABSTRACT

A solid-state imaging device in which a signal from a first photoelectric conversion portion of one pixel, signals from the first photoelectric conversion portion and a second photoelectric conversion portion of the one pixel, and a noise signal from the one pixel are converted into a first digital signal, a second digital signal, and a third digital signal, respectively. As signals of pixels in a first pixel row, the first, the second, and the third digital signals are input from a memory unit to output signal lines. As signals of pixels in a second pixel row adjacent to the first pixel row of a pixel unit in the row direction, the second and the third digital signals are input from the memory unit to the output signal lines while the first digital signal is not output.

19 Claims, 19 Drawing Sheets

(56) References Cited

U.S. PATENT DOCUMENTS

| | | | |
|---|---|---|---|
| 2014/0016006 A1* | 1/2014 | Tashiro | H04N 5/3741 348/281 |
| 2015/0049232 A1* | 2/2015 | Kim | H04N 5/378 348/308 |
| 2015/0116564 A1* | 4/2015 | Williams | H04N 5/37455 348/308 |
| 2015/0138408 A1* | 5/2015 | Lee | H04N 5/378 348/294 |
| 2015/0189213 A1* | 7/2015 | Tanaka | H04N 5/369 250/208.1 |
| 2015/0189214 A1* | 7/2015 | Kurose | H01L 25/18 250/208.1 |
| 2015/0237286 A1* | 8/2015 | Saito | H03M 1/34 250/208.1 |
| 2015/0244963 A1* | 8/2015 | Totsuka | H04N 5/37455 348/308 |
| 2015/0301886 A1* | 10/2015 | Watanabe | G06F 3/0619 714/807 |
| 2016/0301886 A1* | 10/2016 | Muto | H04N 5/378 |
| 2017/0078607 A1* | 3/2017 | Totsuka | H04N 5/37455 |
| 2018/0035108 A1* | 2/2018 | Chae | H04N 5/378 |

\* cited by examiner

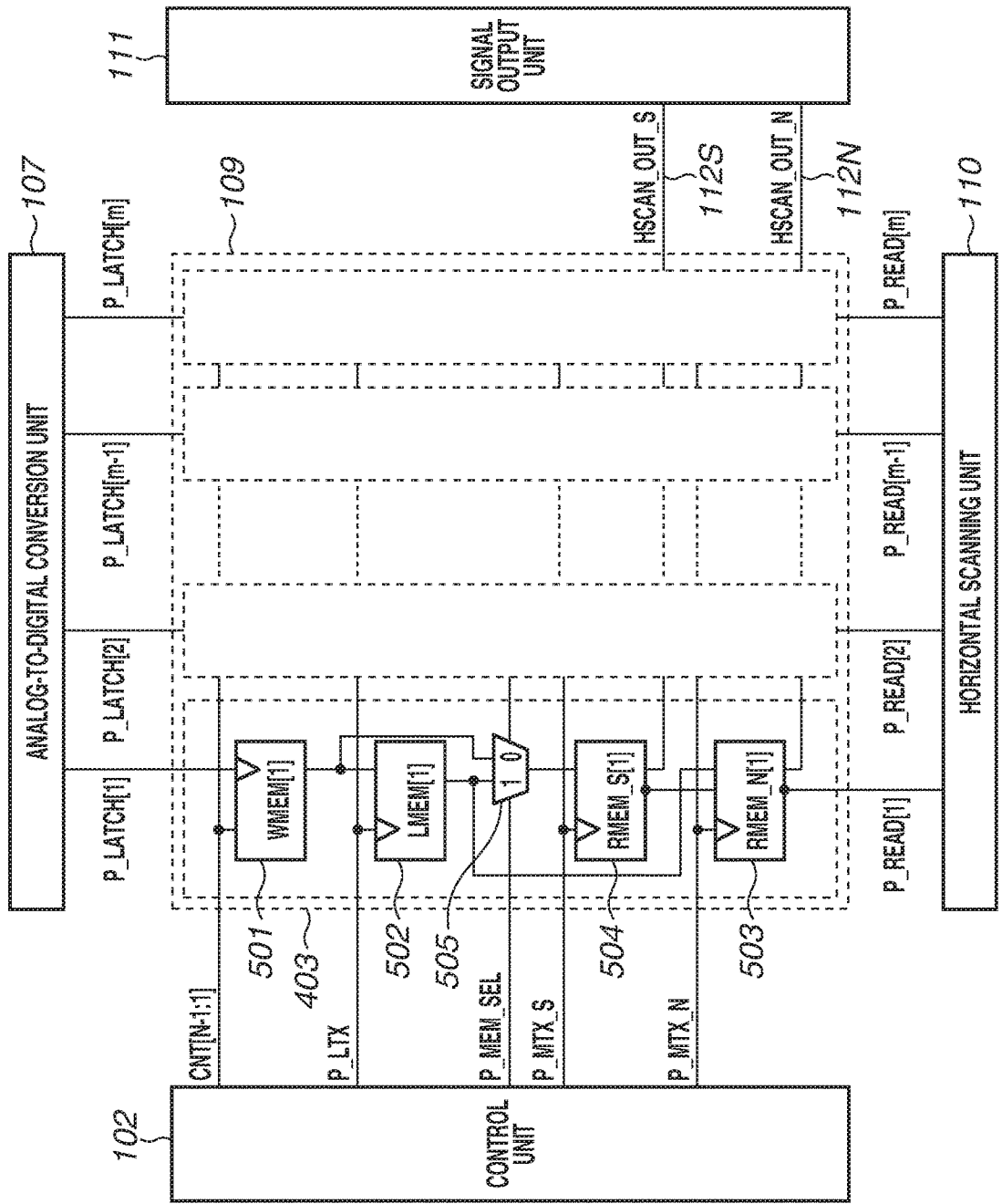

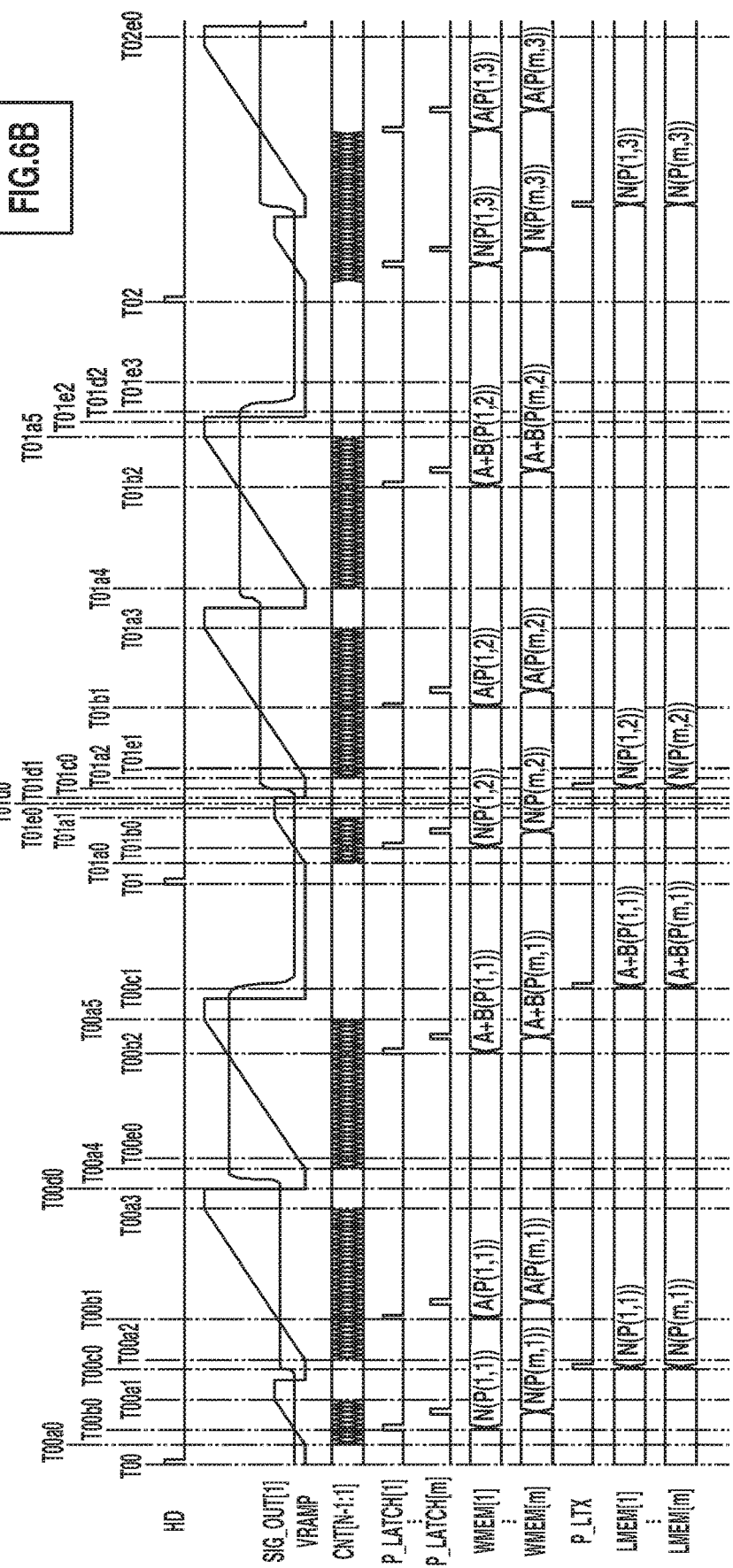

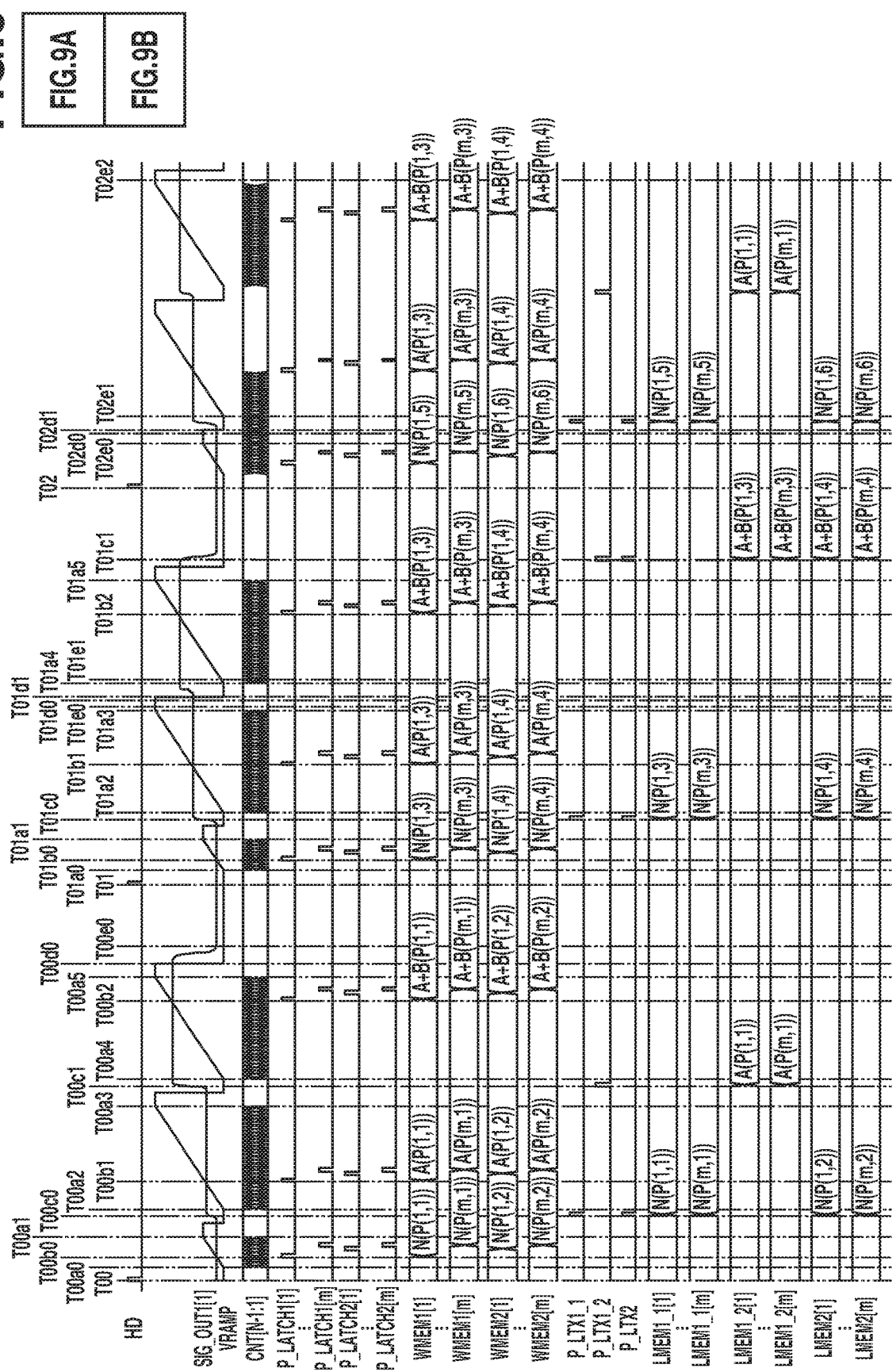

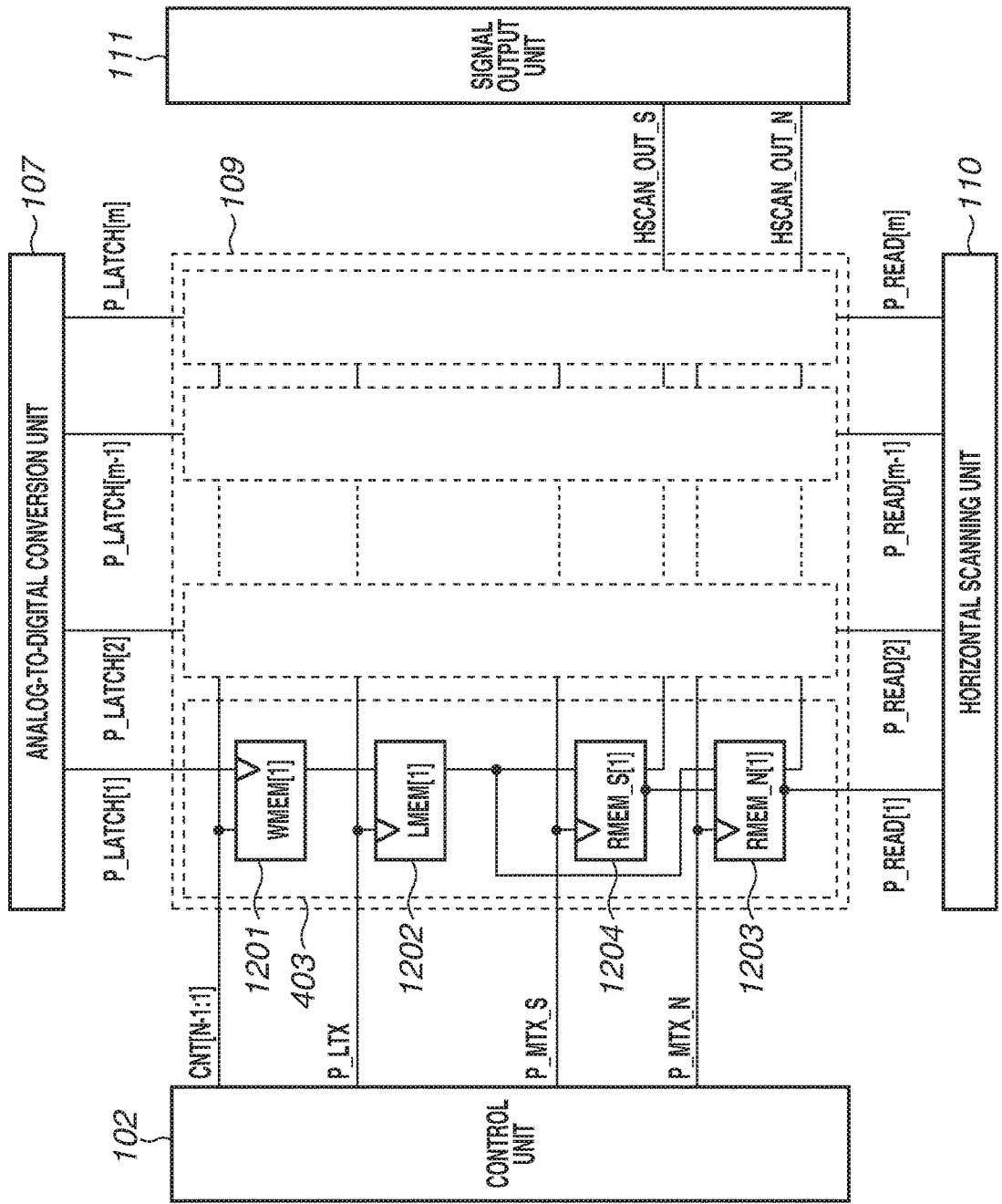

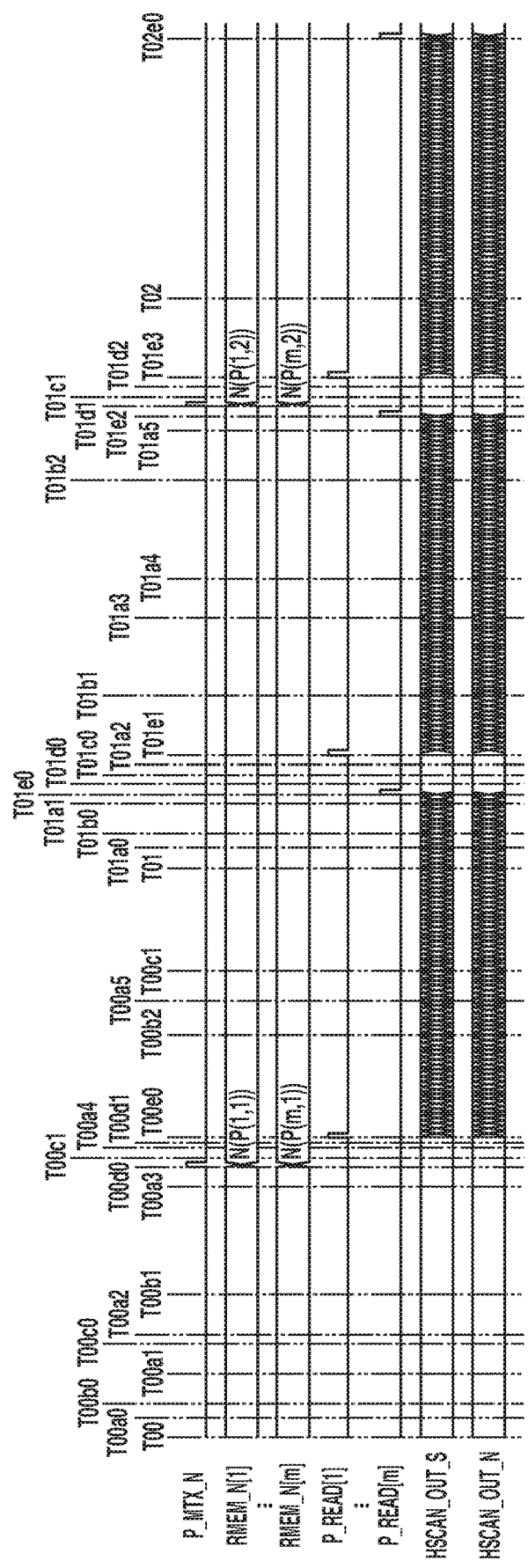

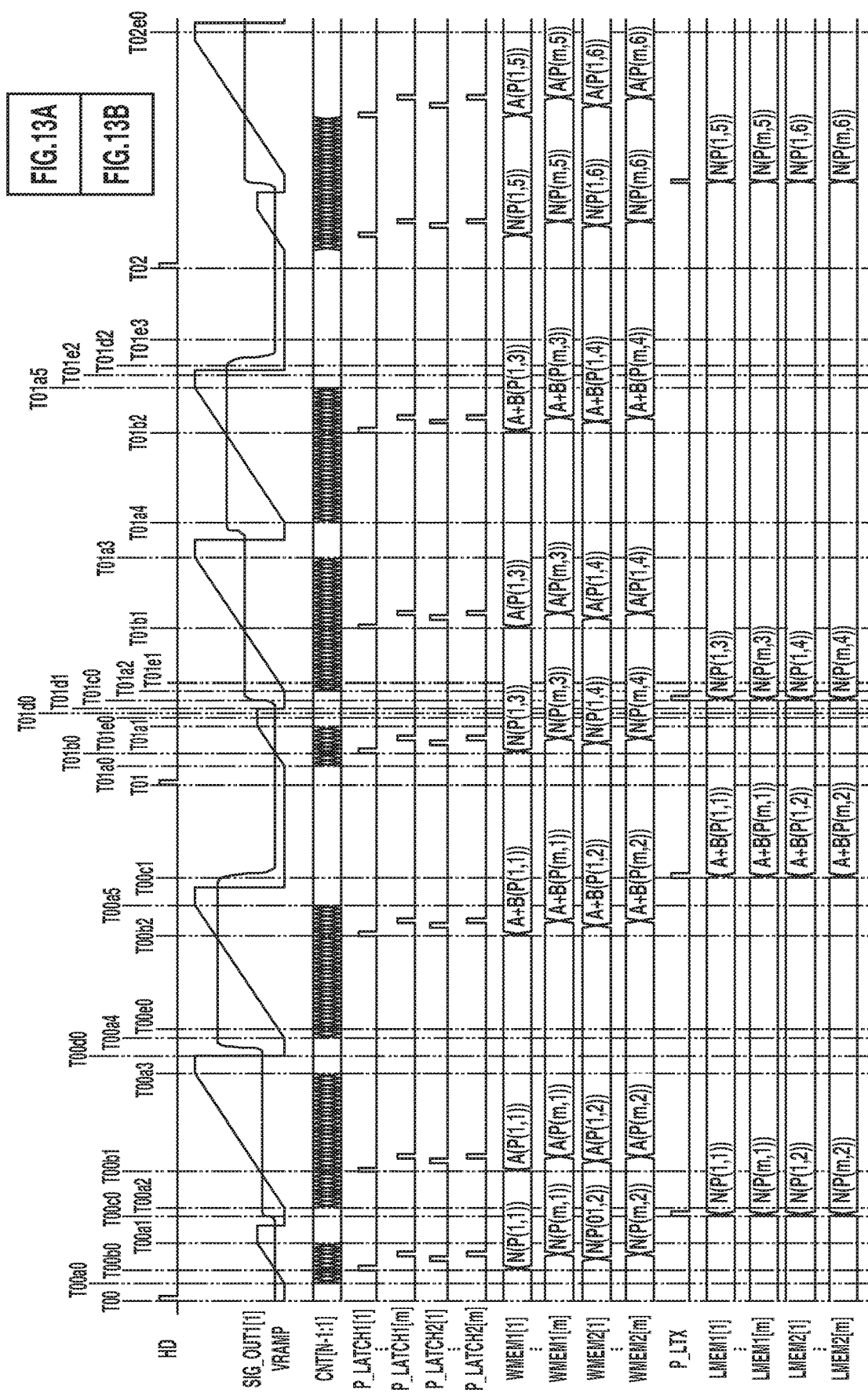

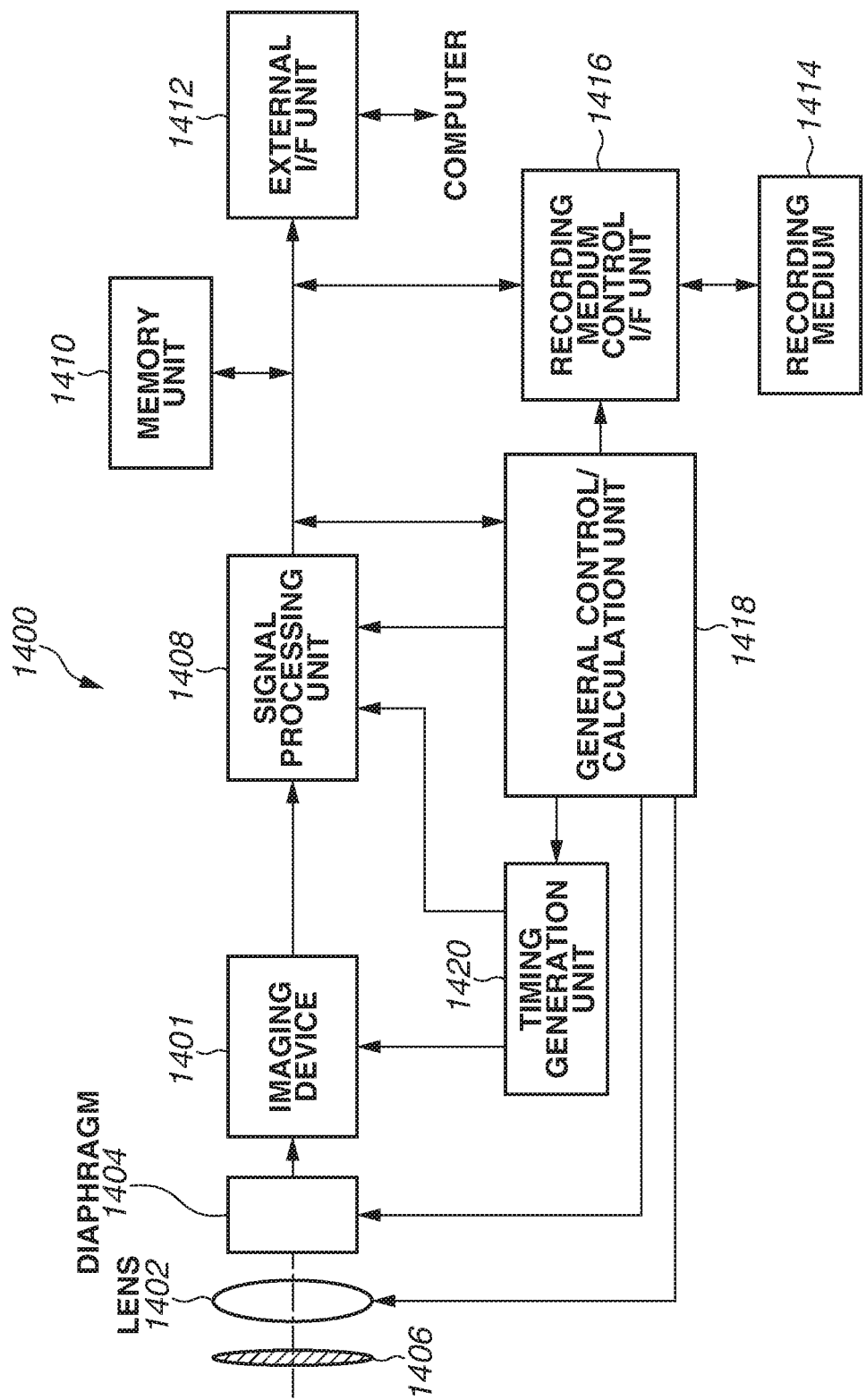

SOLID-STATE IMAGING DEVICE, IMAGING SYSTEM, AND MOVING BODY

BACKGROUND OF THE INVENTION

Field of the Invention

The aspect of the embodiments relates to a solid-state imaging device, an imaging system, and a moving body.

Description of the Related Art

There has been proposed an image plane phase difference method in which pixels for phase difference focus detection are arranged in a solid-state imaging device in an imaging system such as a digital camera having a complementary metal oxide semiconductor (CMOS) image sensor as a solid-state imaging device. A technique discussed in Japanese Patent Application Laid-Open No. 2013-211833 makes it possible to acquire both a focus detection signal and an image forming signal.

SUMMARY OF THE INVENTION

According to a first aspect of the embodiments, a solid-state imaging device includes a pixel unit including a plurality of pixels arranged in a matrix form, each of the pixels having a first photoelectric conversion portion and a second photoelectric conversion portion, an analog-to-digital conversion unit configured to convert a first analog signal based on electric charge generated by the first photoelectric conversion portion into a first digital signal, convert, into a second digital signal, a second analog signal acquired by adding a signal based on electric charge generated by the first photoelectric conversion portion and a signal based on electric charge generated by the second photoelectric conversion portion, and convert a noise signal from each of the pixels into a third digital signal, a memory unit configured to hold the first, the second, and the third digital signals, and an output signal line configured to output at least one of the first, the second, and the third digital signals held in the memory unit, wherein a first reading operation is performed on pixels in a first pixel row of the pixel unit, and then a second reading operation is performed on pixels in a second pixel row read next to the first pixel row of the pixel unit, wherein, in the first reading operation, the first, the second, and the third digital signals are held from the analog-to-digital conversion unit to the memory unit and then output from the memory unit to the output signal line, and wherein, in the second reading operation, the first, the second, and the third digital signals are held from the analog-to-digital conversion unit to the memory unit, and then the second and the third digital signals are output from the memory unit to the output signal line while the first digital signal is not output.

According to a second aspect of the embodiments, an analog-to-digital converter includes an analog-to-digital conversion unit configured to convert an analog signal from a pixel into a digital signal, and a memory unit connected to the analog-to-digital conversion unit, wherein the memory unit includes a first memory having an input terminal connected with an output terminal of the analog-to-digital conversion unit, a second memory having an input terminal connected with an output terminal of the first memory, a third memory having an input terminal connected with an output terminal of the second memory and having an output terminal connected with a first output signal line, a selection circuit having a first input terminal connected with the output terminal of the first memory and having a second input terminal connected with the output terminal of the second memory, and a fourth memory having an input terminal connected with an output terminal of the selection circuit and having an output terminal connected with a second output signal line different from the first output signal line.

According to a third aspect of the embodiments, an analog-to-digital converter includes an analog-to-digital conversion unit configured to convert an analog signal from a pixel into a digital signal, and a memory unit connected to the analog-to-digital conversion unit, wherein the memory unit includes a first memory having an input terminal connected with an output terminal of the analog-to-digital conversion unit, a second memory having an input terminal connected with an output terminal of the first memory, a third memory having an input terminal connected with an output terminal of the second memory and having an output terminal connected with a first output signal line, and a fourth memory having an input terminal connected with the output terminal of the second memory and having an output terminal connected with a second output signal line different from the first output signal line.

Further features of the disclosure will become apparent from the following description of exemplary embodiments with reference to the attached drawings.

BRIEF DESCRIPTION OF THE DRAWINGS

FIG. 5 illustrates an example of a configuration of a memory block according to the first exemplary embodiment.

FIG. 10 illustrates an example of a configuration of a memory block according to a third exemplary embodiment.

FIG. 14 illustrates an example of an imaging system according to a fifth exemplary embodiment.

DESCRIPTION OF THE EMBODIMENTS

In an imaging system discussed in Japanese Patent Application Laid-Open No. 2013-211833, as illustrated in FIG. 1(a) of Japanese Patent Application Laid-Open No. 2013-211833, pixels arranged in the same row include only pixels for acquiring both a focus detection signal and an image forming signal, or only pixels for acquiring only the image forming signal. In this case, in a row including only pixels for acquiring only the image forming signal, the focus detection signal is not acquired since the acquisition of the focus detection signal is not required.

Therefore, a pixel for acquiring both the focus detection and the image forming signals and a pixel for acquiring only the image forming signal are different in charge accumulation time in a photoelectric conversion portion for an acquisition signal serving as the image forming signal. More specifically, a pixel for acquiring only the image forming signal needs a shorter charge accumulation time in the photoelectric conversion portion for an acquisition signal serving as the image forming signal than a pixel for acquiring both the focus detection and the image forming signals because the pixel for acquiring only the image forming signal need not time for processing the focus detection signal. The image quality of a formed image may be deteriorated by the difference in charge accumulation time. Therefore, a solid-state imaging device including a pixel row for acquiring both the focus detection and the image forming signals and a pixel row for acquiring only the image forming signal needs to reduce the difference in charge accumulation time in the photoelectric conversion portion between pixel rows.

According to some exemplary embodiments, it is possible to reduce the difference in charge accumulation time in the photoelectric conversion portion for the acquisition signal serving as image data between a pixel row for acquiring both focus detection data and image data and a pixel row for acquiring only image data. Thus, the image quality can be improved to a further extent.

<Overall Block Diagram>

Figure 1:
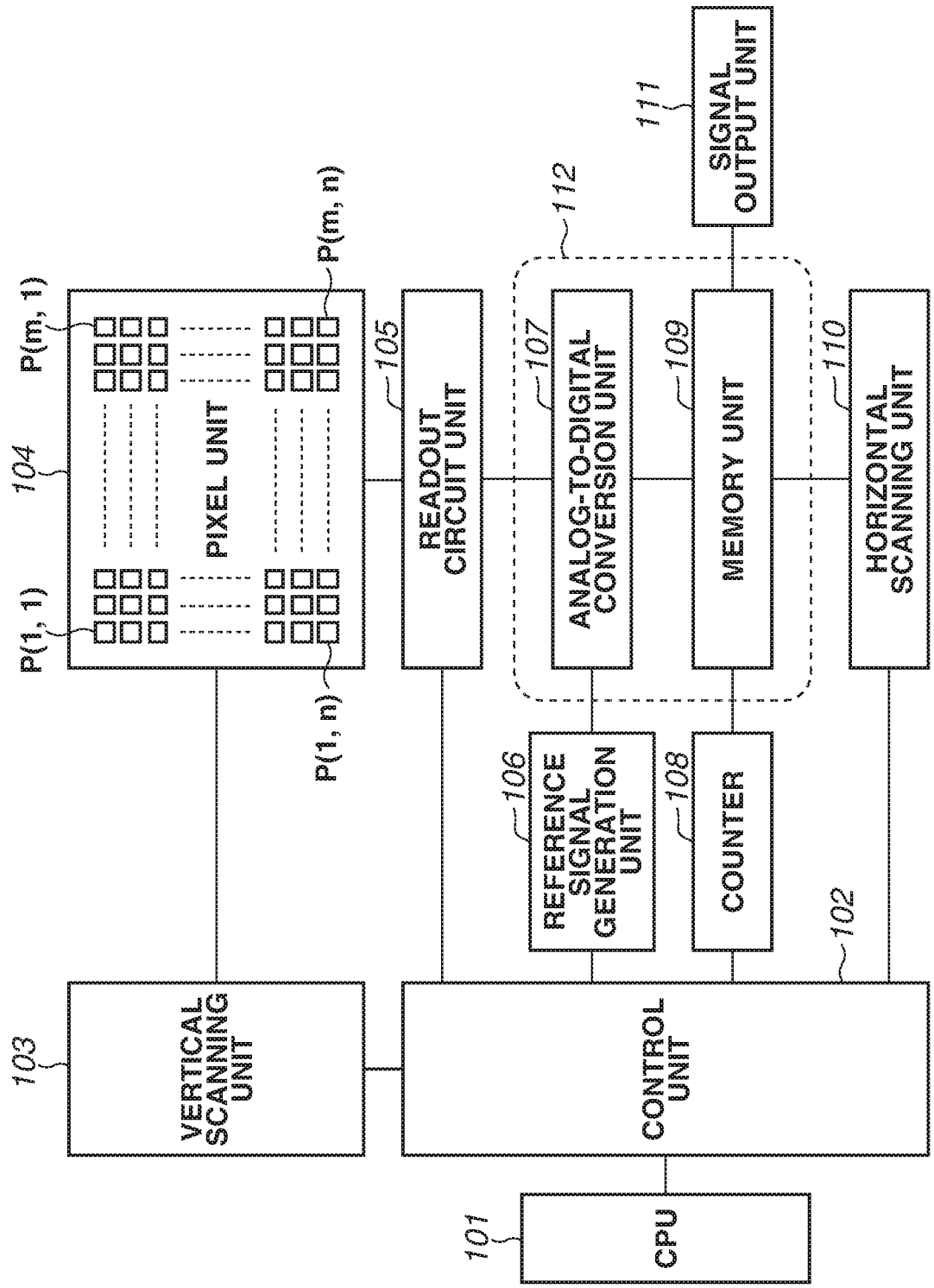
FIG. 1 is a block diagram illustrating an example of a configuration of an imaging system according to a first exemplary embodiment.

FIG. 1 is a block diagram illustrating an example of a configuration of an imaging system according to a first exemplary embodiment. The imaging system is, for example, a digital camera.

The imaging system includes a central processing unit (CPU) 101 for controlling the entire apparatus, and a control unit 102 that operates upon reception of a synchronization signal from the CPU 101 and communication from outside. The imaging system includes a vertical scanning unit 103 that operates upon reception of a control signal of the control unit 102, a pixel unit 104 including pixels P arranged in a matrix form, and a readout circuit unit 105 for reading a signal from the pixel unit 104. The imaging system further includes an analog-to-digital converter 112, a horizontal scanning unit 110, and a signal output unit 111. The analog-to-digital converter 112 includes an analog-to-digital conversion unit 107 and a memory unit 109 connected to the analog-to-digital conversion unit 107.

The analog-to-digital conversion unit 107 compares the signal from the readout circuit unit 105 with the signal from a reference signal generation unit 106 and outputs a digital signal. The memory unit 109 maintains the value of a counter 108 at a timing when the signal from the analog-to-digital conversion unit 107 is input. The pixel unit 104, the CPU 101, the analog-to-digital converter 112 may be disposed on the same substrate or may be disposed on different substrates and connected with each other.

<Pixel Unit>

Figure 2:
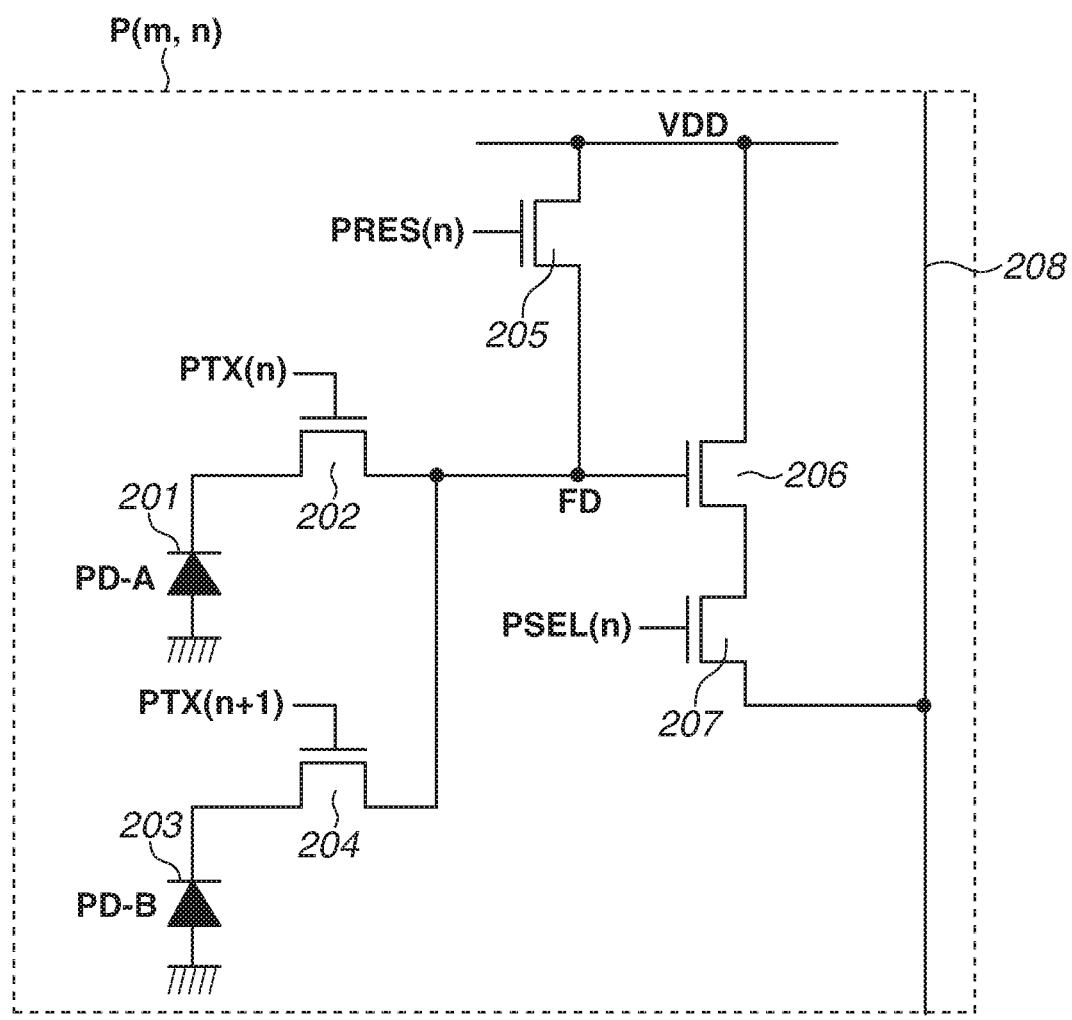
FIG. 2 is an equivalent circuit diagram illustrating an example of a pixel P in a pixel unit 104 according to the first exemplary embodiment.

FIG. 2 illustrates an example of a configuration of a pixel P of the pixel unit 104. The pixel P includes a photoelectric conversion portion 201, an electric charge transfer portion 202 for transferring electric charge of the photoelectric conversion portion 201, a photoelectric conversion portion 203, and an electric charge transfer portion 204 for transferring electric charge of the photoelectric conversion portion 203. The pixel P further includes a floating diffusion portion FD, a reset portion 205, a signal amplification portion 206, and a row selection portion 207. Each of the photoelectric conversion portions 201 and 203 converts light incident thereto into electric charge. For example, each of the photoelectric conversion portions 201 and 203 can be formed of a photodiode.

The electric charge transfer portion 202 of the photoelectric conversion portion 201 is disposed on the electric path between the photoelectric conversion portion 201 and the floating diffusion portion FD. The electric charge transfer portion 204 of the photoelectric conversion portion 203 is disposed on the electric path between the photoelectric conversion portion 203 and the floating diffusion portion FD. The electric charge transfer portion 202 is a transfer transistor for reading electric charge accumulated in the photoelectric conversion portion 201. The conductive/non-conductive (ON/OFF) state is controlled by a pixel transfer signal PTX(n). In a similar manner, the electric charge transfer portion 204 is a transfer transistor for reading electric charge accumulated in the photoelectric conversion portion 203. The conductive/non-conductive (ON/OFF) state is controlled by a pixel transfer signal PTX(n+1).

The reset portion 205 is disposed on the electric path between the wiring supplied with a power voltage VDD and the floating diffusion portion FD. The reset portion 205 is a reset transistor for resetting the floating diffusion portion FD by supplying the power voltage VDD to the floating diffusion portion FD. The conductive/non-conductive (ON/OFF) state of the reset portion 205 is controlled by a pixel unit reset signal PRES(n).

The floating diffusion portion FD is connected to the gate terminal of the signal amplification portion 206. The power voltage VDD and the row selection portion 207 are connected to the drain and source terminals of the signal amplification portion 206, respectively. The signal amplification portion 206 is a source follower circuit for converting electric charge of the floating diffusion portion FD into a voltage and outputs the voltage to a vertical signal line 208. For example, the signal amplification portion 206 can be formed of a transistor.

The row selection portion 207 is disposed on the electric path between the output of the signal amplification portion 206 and the vertical signal line 208. The row selection portion 207 is a transistor for selecting a row for outputting a pixel signal. The conductive/non-conductive (ON/OFF) state of the row selection portion 207 is controlled by a row selection signal PSEL(n).

Figure 3:
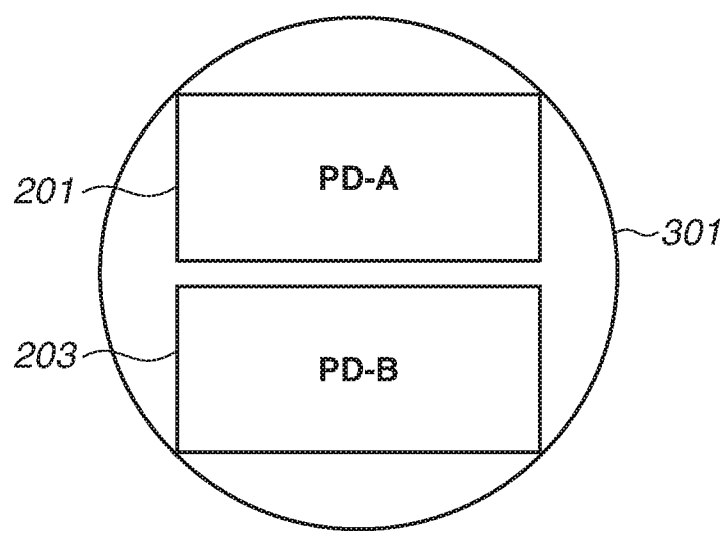
FIG. 3 is a top view schematically illustrating an example of the pixel P of the pixel unit according to the first exemplary embodiment.

FIG. 3 is a top view schematically illustrating each pixel. The photoelectric conversion portions 201 and 203 of each pixel of the pixel unit 104 share one micro lens 301. More specifically, the photoelectric conversion portions 201 and 203 receive light that passed through the one micro lens 301.

<Column Circuit Unit>

Figure 4:
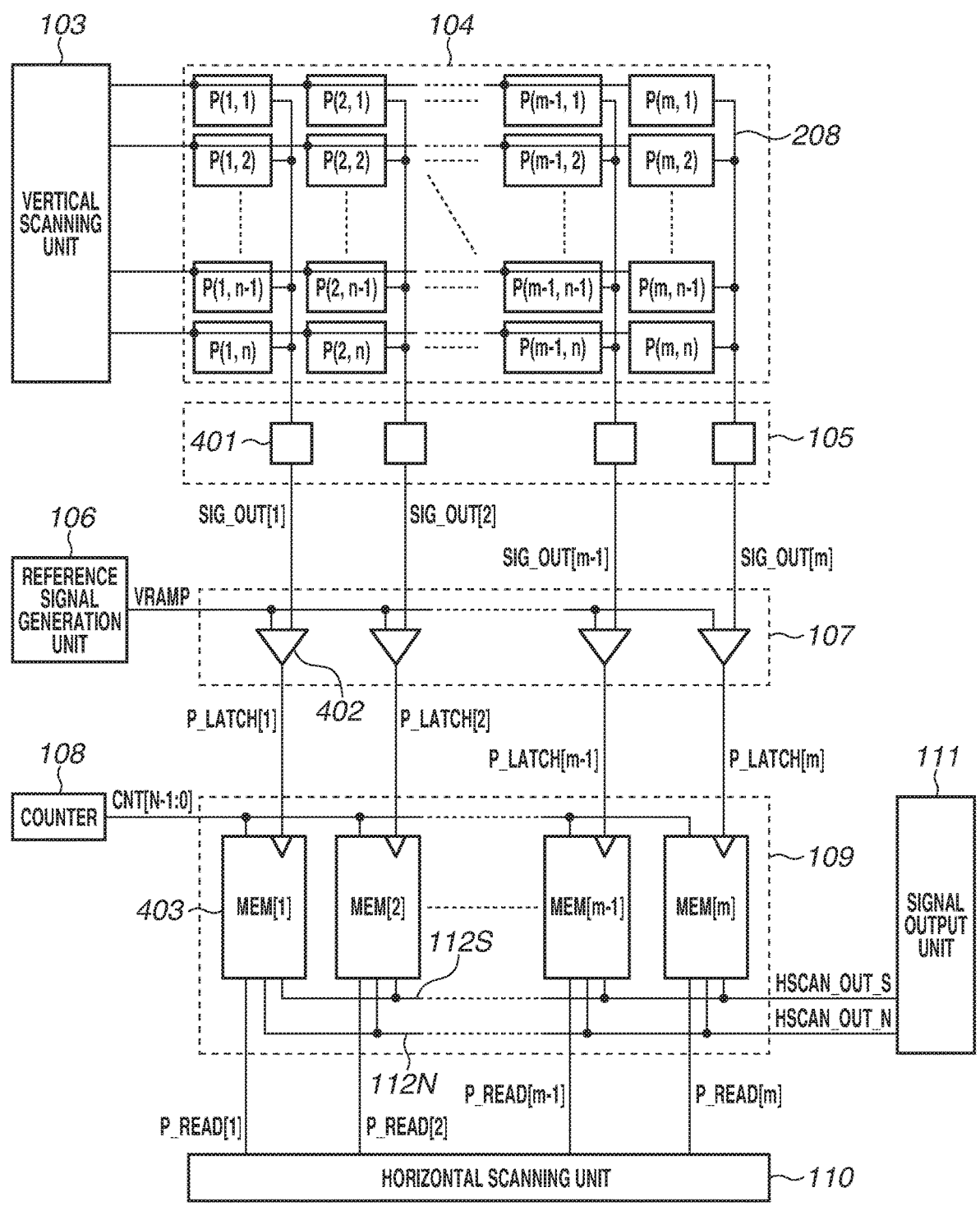
FIG. 4 illustrates a relationship in each column between the pixel unit 104, a readout circuit unit, an analog-to-digital conversion unit, and a memory unit according to the first exemplary embodiment.

FIG. 4 illustrates a relationship in each column between the pixel unit 104, the readout circuit unit 105, the analog-to-digital conversion unit 107, and the memory unit 109 according to the present exemplary embodiment.

The pixel unit 104 has one vertical output line 208 for each column. The vertical scanning unit 103 sequentially selects, on a row basis, the pixels P arranged in a matrix form. The output signal from a selected pixel P is input to a readout circuit 401 for each column. The readout circuit unit 105 includes a plurality of readout circuits 401 arranged for respective columns of the pixel unit 104. The readout circuit 401 of each column reads and holds signals from pixels in each row. The readout circuit 401 may include an amplifier for amplifying the signal output from each pixel P and may include a current source for driving internal circuits of the pixel P. Hereinbelow, an example of the readout circuit 401 including an amplifier will be described.

The reference signal generation unit 106 generates a reference signal VRAMP (ramp signal) having a potential that changes with a fixed inclination per unit time. The reference signal VRAMP is not limited to a ramp signal and may change in step form as long as the signal changes in level with time.

The analog-to-digital conversion unit 107 includes a plurality of comparison circuits 402 arranged for respective columns. The comparison circuit 402 of each column compares the magnitude of the reference signal VRAMP output from the reference signal generation unit 106 with the magnitude of an output signal SIG_OUT of the readout circuit 401 of each column. When the magnitude relationship between the two signals is reversed, the comparison circuit 402 outputs a comparison result signal P_LATCH.

The output signal SIG_OUT includes output signals SIG_OUT[1] to SIG_OUT[m] as output signals for respective columns. The comparison result signal P_LATCH includes comparison result signals P_LATCH[1] to P_LATCH[m] as comparison result signals for respective columns. m is a natural number indicating the number of columns. The counter 108 counts N-bit count values (N is a natural number) according to the resolution of the analog-to-digital conversion and outputs count signals CNT[0] to CNT[N−1].

The memory unit 109 includes memory blocks 403 for respective columns. The memory blocks 403 of respective columns respectively hold the counter signals CNT[0] to CNT[N−1] at a timing of the comparison result signals P_LATCH.

The horizontal scanning unit 110 outputs readout signals P_READ (P_READ[1] to P_READ[m]) for respective columns. The memory block 403 of the memory unit 109 of each column outputs holding data to the signal output unit 111 via the output signal lines HSCAN_OUT_N and HSCAN_OUT_S at a timing according to the readout signal P_READ of each column.

<Memory Blocks>

FIG. 5 illustrates an example of a configuration of the memory block 403 according to the present exemplary embodiment. The memory block 403 includes a first memory 501, a second memory 502, a third memory 503, a fourth memory 504, and a selection circuit 505. For example, each of the first memory 501 to the fourth memory 504 can be formed of a latch circuit.

Digital signals held in the first memory 501, the second memory 502, the third memory 503, and the fourth memory 504 are referred to as digital signals WMEM, LMEM, RMEM_N, and RMEM_S, respectively. Digital signals held in the memory in column i are indicated by digital signals WMEM[i], LMEM[i], RMEM_N[i], and RMEM_S[i], respectively. i is a natural number from 1 to m.

According to the comparison result signal P_LATCH, the first memory 501 holds as the digital signal WMEM the count signal CNT output from the counter 108. The output terminal of the first memory 501 is connected to the input terminals of the second memory 502 and the selection circuit 505.

According to a first transfer control signal P_LTX, the digital signal WMEM held in the first memory 501 is transferred to and held in the second memory 502 as the digital signal LMEM. The output terminal of the second memory 502 is connected to the input terminals of the third memory 503 and the selection circuit 505.

According to a second transfer control signal P_MTX_N, the digital signal LMEM held in the second memory 502 is transferred to and held in the third memory 503 as the digital signal RMEM_N. According to the readout control signal P_READ output from the horizontal scanning unit 110 to each column, the third memory 503 outputs the digital signal RMEM_N to the first output signal line HSCAN_OUT_N.

When the third memory 503 is not selected by the readout control signal P_READ, the output terminal of the third memory 503 connected to the first output signal line HSCAN_OUT_N is set to the high-impedance state. More specifically, according to the readout control signal P_READ, the third memory 503 is able to output three different values (high level, low level, and high-impedance state) to the first output signal line HSCAN_OUT_N.

According to a third transfer control signal P_MTX_S, the digital signal selected by the selection circuit 505 is transferred to and held in the fourth memory 504 as the digital signal RMEM_S. According to the readout control signal P_READ output from the horizontal scanning unit 110 to each column, the fourth memory 504 outputs the digital signal RMEM_S to the second output signal line HSCAN_OUT_S. The input terminal of the fourth memory 504 is connected with the output terminal of the selection circuit 505.

Similarly to the third memory 503, according to the readout control signal P_READ, the fourth memory 504 is able to output three different values (high level, low level, and high-impedance state) to the second output signal line HSCAN_OUT_S.

The first memory 501 and the second memory 502 may also be able to output the three different values or output two different values (high level and low level).

The selection circuit 505 selects either the first memory 501 or the second memory 502 according to a selection signal P_MEM_SEL and outputs the digital signal held in the selected memory. The selection circuit 505 has an input terminal connected with the output terminal of the first memory 501, and an input terminal connected with the output terminal of the second memory 502.

<First Driving Method>

Figure 6B:
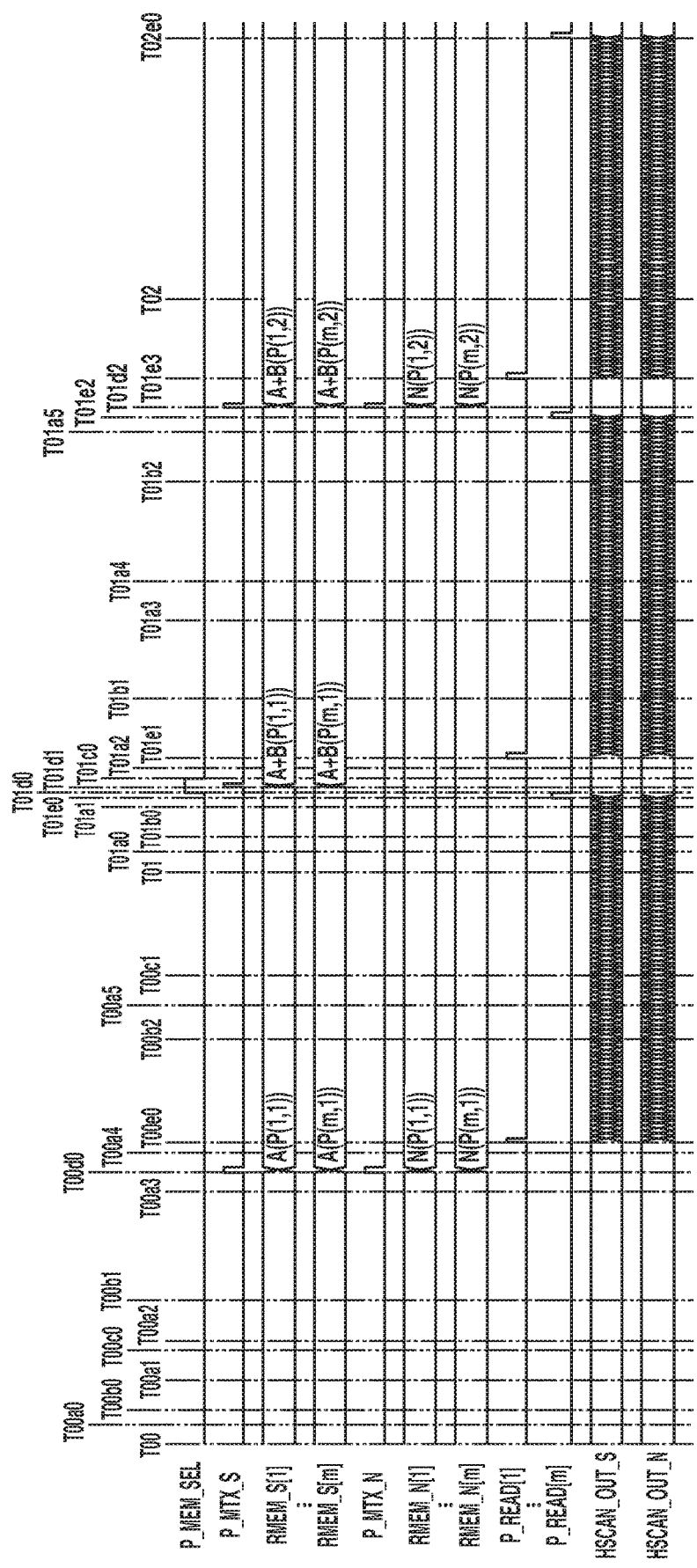
FIG. 6 (consisting of FIGS. 6A and 6B) is a timing chart illustrating an example of operations of the analog-to-digital conversion unit and the memory unit according to the first exemplary embodiment.

FIG. 6 (consisting of FIGS. 6A and 6B) is a timing chart illustrating an example of operations of the analog-to-digital conversion unit 107 and the memory unit 109 illustrated in FIG. 5.

At a time T00, the CPU 101 instructs the control unit 102 to set the horizontal synchronization signal HD to the high level.

At a time T00a0, the counter 108 starts counting, the reference signal generation unit 106 starts generating the reference signal VRAMP, and the analog-to-digital conversion unit 107 starts the analog-to-digital conversion for pixels in row 1 of the pixel unit 104. The output signal SIG_OUT used at this time is a noise signal (N) of the pixel unit 104 and the readout circuit unit 105 in the reset state.

At a time T00b0, the output signal SIG_OUT of the pixel P(1, 1) in column 1 of row 1 of the pixel unit 104 coincides with the reference signal VRAMP, and the comparison result signal P_LATCH[1] is output. At this time, the count value (N(P(1, 1))) at the time T00b0 is held in the first memory 501 as a digital signal WMEM[1]. In a similar manner, the analog-to-digital conversion unit 107 also performs the analog-to-digital conversion on pixels in columns 2 to m of row 1.

At a time T00a1, the counter 108 ends counting, and the analog-to-digital conversion unit 107 ends the analog-to-digital conversion on all of the pixel signals in row 1 and the noise signal of the readout circuit units 105 in the reset state.

At a time T00c0, the control unit 102 sets the transfer control signal P_LTX to the high level. In response thereto, the digital signal WMEM held in the first memory 501 of each column is written to and held in the second memory 502 of each column (LMEM).

At a time T00a2, the counter 108 starts counting, the reference signal generation unit 106 starts generating the reference signal VRAMP, and the analog-to-digital conversion unit 107 starts the analog-to-digital conversion on pixels in row 1 of the pixel unit 104. The output signal SIG_OUT used at this time is a signal (A) based on the photoelectric conversion portion 201 of the pixel unit 104 (not based on the photoelectric conversion portion 203). This signal is referred to as a first pixel signal.

At a time T00b1, the output signal SIG_OUT of a pixel P(1, 1) of the pixel unit 104 coincides with the reference signal VRAMP, and the comparison result signal P_LATCH [1] is output. At this time, a count value (A(P(1, 1))) at the time T00b1 is held in the first memory 501 as the digital signal WMEM[1]. In a similar manner, the analog-to-digital conversion unit 107 also performs the analog-to-digital conversion on pixels in columns 2 to m of row 1.

At a time T00a3, the counter 108 ends counting, and the analog-to-digital conversion unit 107 ends the analog-to-digital conversion on the first pixel signals in row 1.

At a time T00d0, the control unit 102 sets the transfer control signals P_MTX_N and P_MTX_S to the high level. In response thereto, the digital signal LMEM held in the second memory 502 of each column is written into the third memory 503 of each column (RMEM_N). The digital signal WMEM held in the first memory 501 of each column is written into the fourth memory 504 of each column (RMEM_S). At this time, the digital signal RMEM_S held in the fourth memory 504 is the digital signal (A) based on the first pixel signal.

At a time T00a4, the counter 108 starts counting, the reference signal generation unit 106 starts generating the reference signal VRAMP, and the analog-to-digital conversion unit 107 starts the analog-to-digital conversion on pixels in row 1 of the pixel unit 104. The output signal SIG_OUT used At this time is a signal (A+B), which is the sum of the signal based on the photoelectric conversion portion 201 of the pixel unit 104 and the signal based on the photoelectric conversion portion 203. This signal is referred to as a second pixel signal.

At a time T00e0, the horizontal scanning unit 110 outputs the readout control signal P_READ[1] for column 1. Then, the digital signal RMEM_N[1] is output to the signal output unit 111 via the output signal line HSCAN_OUT_N, and the digital signal RMEM_S[1] is output thereto via the output signal line HSCAN_OUT_S. In a similar manner, in the subsequent time period until time T01e0, the digital signal RMEM_N held in the third memory 503 and the digital signal RMEM_S held in the fourth memory 504 are output to the signal output unit 111. The digital signals RMEM_S read in this time period are digital signals (A) based on the first pixel signal.

At a time T00b2, the output signal SIG_OUT of the pixel P(1, 1) of the pixel unit 104 coincides with the reference signal VRAMP, and the comparison result signal P_LATCH [1] is output. At this time, the first memory 501 holds a count value (A+B(P(1, 1))) at the time T00b2 as the digital signal WMEM[1]. In a similar manner, the analog-to-digital conversion unit 107 also performs the analog-to-digital conversion on pixels in columns 2 to m of row 1.

At a time T00a5, the counter 108 ends counting, and the analog-to-digital conversion unit 107 ends the analog-to-digital conversion on all of the second pixel signals in row 1.

At a time T00c1, the control unit 102 sets the transfer control signal P_LTX to the high level, and the digital signal WMEM held in the first memory 501 of each column is written into the second memory 502 of each column (LMEM). At this time, the digital signal LMEM held in the second memory 502 is the digital signal (A+B) based on the second pixel signal.

At a time T01, the CPU 101 instructs the control unit 102 to set the horizontal synchronization signal HD to the high level. The time period since the horizontal synchronization signal HD is set to the high level at the time T00 until the horizontal synchronization signal is set to the high level next time at the time T01 is referred to as one horizontal period.

At a time T01a0, the counter 108 starts counting, the reference signal generation unit 106 starts generating the reference signal VRAMP, and the analog-to-digital conversion unit 107 starts the analog-to-digital conversion on pixels in row 2 of the pixel unit 104. The output signal SIG_OUT used At this time is the noise signal (N) of the pixel unit 104 and the readout circuit unit 105 in the reset state.

At a time T01b0, the output signal SIG_OUT of the pixel P(1, 2) of the pixel unit 104 coincides with the reference signal VRAMP, and the comparison result signal P_LATCH [1] is output. At this time, the count value (N(P(1, 2))) at the time T01b0 is held in the first memory 501 as the digital signal WMEM[1]. In a similar manner, the analog-to-digital conversion unit 107 also performs the analog-to-digital conversion on pixels in columns 2 to m of row 2.

At a time T01a1, the counter 108 ends counting, and the analog-to-digital conversion unit 107 ends the analog-to-digital conversion on all of the pixel signals in row 2 and the noise signal of the readout circuit unit 105 in the reset state.

At a time T01d0, the control unit 102 sets the selection signal P_MEM_SEL to the high level. At this time, the signal selected by the selection circuit 505 serves as the digital signal LMEM held in the second memory 502.

At a time T01d1, the control unit 102 sets the transfer control signal P_MTX_S to the high level, and the digital signal LMEM held in the second memory 502 selected by the selection circuit 505 is written into the fourth memory 504 of each column (RMEM_S). At this time, the digital signal RMEM_S held in the fourth memory 504 is the digital signal (A+B) based on the second pixel signal.

At a time T01c0, the control unit 102 sets the transfer control signal P_LTX to the high level, and the digital signal WMEM held in the first memory 501 of each column is written into the second memory 502 of each column (LMEM).

At a time T01a2, the counter 108 starts counting, the reference signal generation unit 106 starts generating the reference signal VRAMP, and the analog-to-digital conversion unit 107 starts the analog-to-digital conversion on pixels in row 1 of the pixel unit 104. The output signal SIG_OUT used At this time is the signal (A) based on the photoelectric conversion portion 201 of the pixel unit 104. This signal is referred to as a third pixel signal.

At a time T01e1, the horizontal scanning unit 110 sets the readout control signal P_READ[1] for column 1 to the high level. In response thereto, the digital signal RMEM_N[1] is output to the output signal line HSCAN_OUT_N, and the digital signal RMEM_S[1] is output to the output signal line HSCAN_OUT_S. In a similar manner, in the subsequent time period until time T01e2, the digital signal RMEM_N held in the third memory 503 and the digital signal RMEM_S held in the fourth memory 504 are output to the respective output signal lines. The digital signal RMEM_S read in this time period is the digital signal (A+B) based on the second pixel signal.

At a time T01b1, the output signal SIG_OUT of the pixel P(1, 2) of the pixel unit 104 coincides with the reference signal VRAMP, and the comparison result signal P_LATCH [1] is output. At this time, a count value (A(P(1, 2))) at the time T01b1 is held in the first memory 501 as the digital signal WMEM[1]. In a similar manner, the analog-to-digital conversion unit 107 also performs the analog-to-digital conversion on pixels in columns 2 to m of row 2.

At a time T01a3, the counter 108 ends counting, and the analog-to-digital conversion unit 107 ends the analog-to-digital conversion on all of the third pixel signals in row 2.

At a time T01a4, the counter 108 starts counting, the reference signal generation unit 106 starts generating the reference signal VRAMP, and the analog-to-digital conversion unit 107 starts the analog-to-digital conversion on pixels in row 1 of the pixel unit 104. The output signal SIG_OUT used At this time is the signal (A+B), which is the sum of the signal based on the photoelectric conversion portion 201 of the pixel unit 104 and the signal based on the photoelectric conversion portion 203. This signal is referred to as a fourth pixel signal.

At a time T01b2, the output signal SIG_OUT of the pixel P(1, 2) of the pixel unit 104 coincides with the reference signal VRAMP, and the comparison result signal P_LATCH [1] is output. At this time, a count value (A+B(P(1, 2))) at the time T01b2 is held in the first memory 501 as the digital signal WMEM[1]. In a similar manner, the analog-to-digital conversion unit 107 also performs the analog-to-digital conversion on pixels in columns 2 to m of row 2.

At a time T01a5, the counter 108 ends counting, and the analog-to-digital conversion unit 107 ends the analog-to-digital conversion on all of the fourth pixel signals in row 2.

At a time T01d2, the control unit 102 sets the transfer control signals P_MTX_N and P_MTX_S to the high level. In response thereto, the digital signal LMEM held in the second memory 502 of each column is written into the third memory 503 of each column (RMEM_N), and the digital signal WMEM held in the first memory 501 of each column is written into the fourth memory 504 of each column (RMEM_S). At this time, the digital signal RMEM_S held in the fourth memory 504 is the digital signal (A+B) based on the fourth pixel signal.

At a time T01e3, the horizontal scanning unit 110 sets the readout control signal P_READ[1] in column 1 to the high level. In response thereto, the digital signal RMEM_N[1] is output to the signal output unit 111 via the output signal line HSCAN_OUT_N, and the digital signal RMEM_S[1] is output thereto via the output signal line HSCAN_OUT_S. In a similar manner, in the subsequent time period until time T02e0, the digital signals RMEM_N and RMEM_S held in the memory 503 and the memory 504, respectively, are output to the signal output unit 111. The digital signal RMEM_S read in this time period is the digital signal (A+B) based on the fourth pixel signal.

At a time T02, the CPU 101 instructs the control unit 102 to set the horizontal synchronization signal HD to the high level.

Subsequently, the CPU 101 alternately performs the operation between the time T00 and the time T01 and the operation between the time T01 and the time T02 on the remaining rows.

According to the present exemplary embodiment, a first analog-to-digital conversion period is the time period between the time T00a2 and the time T00a3 and the time period between the time T01a2 and the time T01a3. In addition, a second analog-to-digital conversion period is the time period between the time T00a4 and the time T00a5 and the time period between the time T01a4 and the time T01a5.

A first horizontal period is the time period between the time T00 and the time T01, and a second horizontal period following (adjoining) the first horizontal period is the time period between the time T01 and the time T02. The first horizontal period is the time period between the time when the horizontal synchronization signal is output from (or set to the high level by) the control unit 102 and the time when the next horizontal synchronization signal is output. During the first horizontal period, the analog-to-digital conversion is performed on the noise signal, the first pixel signal, and the second pixel signal.

When the pixel unit 102 includes pixel rows performing both focus detection and image formation and pixel rows performing only image formation, the pixel unit 102 does not need to output an analog focus detection signal (third image signal) from pixels in a pixel row (row 2 in this case) not used for focus detection. However, when the pixel unit 102 neither outputs the analog focus detection signal nor performs the analog-to-digital conversion, each pixel row will have a different charge accumulation time in the photoelectric conversion portion 201 of each pixel and accordingly different analog processing. This may cause a phenomenon that, even if a subject having the same luminance on the entire surface is captured, the formed image may cause a difference in luminance between pixel rows of the pixel unit 102 of the solid-state imaging device.

According to the present exemplary embodiment, the analog-to-digital conversion is also performed on output signals from pixels in pixel rows with which only the image forming signal is output from the memory unit 109. In other words, the analog-to-digital conversion is performed on output signals from all pixels of the pixel unit 102. Therefore, it is possible to reduce or eliminate the difference in charge accumulation time in the photoelectric conversion portion 201 for the image forming signal between a pixel row performing both focus detection and image formation and a pixel row performing only image formation. Therefore, the difference in luminance between rows of the pixel unit 102, i.e., level differences, can be reduced in the formed image, thus acquiring a smooth image.

According to the present exemplary embodiment, in row 1, both the digital signal corresponding to the first pixel signal based on the output of the photoelectric conversion portion 201 and the digital signal corresponding to the second pixel signal based on the outputs of the photoelectric conversion portions 201 and 203 are output from the fourth memory 504 to the signal output unit 111. On the other hand, in row 2, the digital signal corresponding to the fourth pixel signal based on the outputs of the photoelectric conversion portions 201 and 203 is output from the fourth memory 504, but the digital signal corresponding to the third pixel signal based on the output of the photoelectric conversion portion 201 is not output. This means that the output of the digital signal based on the third pixel signal can be eliminated.

According to the present exemplary embodiment, at the time T00c1, the digital signal based on the second pixel signal is held in the second memory 502. This makes it possible to delay the timing when the fourth memory 504 holds the digital signal based on the second pixel signal and accordingly to delay the timing when the memory unit 109 starts outputting the digital signal based on the second pixel signal to the signal output unit 111. This allows the memory unit 109 to output the digital signal based on the second pixel signal in a time period produced by not outputting the digital signal based on the third pixel signal.

As a result, the time period between the time T00a5 and the time T01e1 is different from the time period between the time T01a5 and the time T01e3. At the time T00a5, the analog-to-digital conversion on the second pixel signal in row 1 is completed. At the time T01e1, the output of the digital signal based on the second pixel signal to the signal output unit 111 is started. At the time T01a5, the analog-to-digital conversion on the fourth pixel signal in row 2 is completed. At the time T01e3, the output of the digital signal based on the fourth pixel signal to the signal output unit 111 is started. The interval at which the horizontal scanning unit 110 outputs the readout signal P_READ becomes constant in the time period between the start of the first horizontal period (T00) and the end of the second horizontal period (T02). The readout signal is a signal for specifying the timing when the memory unit 109 outputs the digital signal to the signal output unit 111.

In this way, the present exemplary embodiment makes it possible to output digital signals from the memory unit 109 to the signal output unit 111 at fixed intervals in two continuous horizontal periods. More specifically, a time period produced by not outputting the digital signal based on the third pixel signal from the memory unit 109 to the output signal lines is allocated as a transfer time for other digital signals. Therefore, sufficient time can be used to transfer each signal even if there are many digital signals to be output from the memory unit 109 to the signal output unit 111. This makes it possible not only to ensure reliability in digital signal transfer but also to restrict the increase in circuit scale.

A second exemplary embodiment will be described below centering on differences from the first exemplary embodiment, and descriptions of portions having similar configurations, functions, and effects to those according to the first exemplary embodiment will be omitted.

<Column Circuit Unit>

Figure 7:
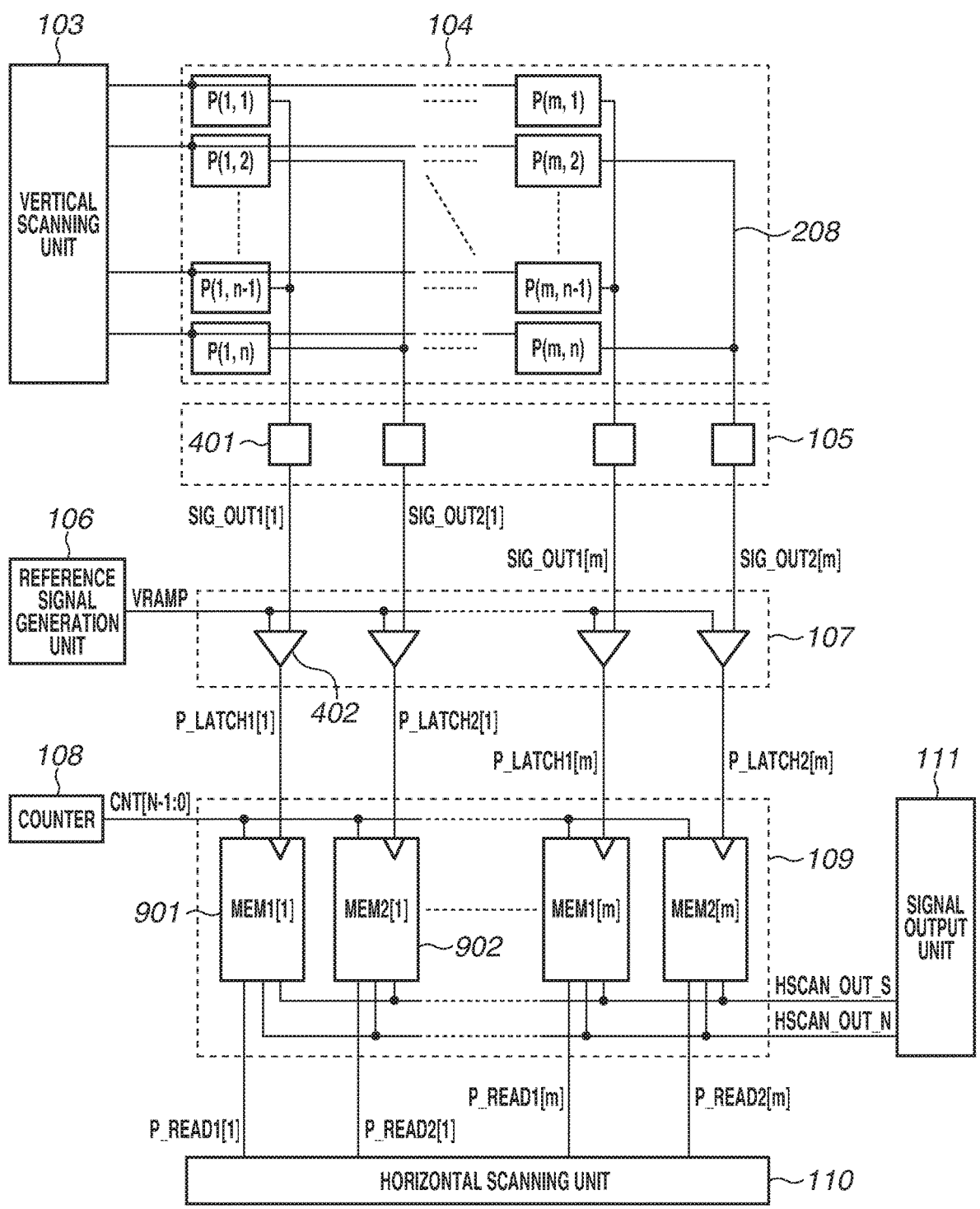
FIG. 7 illustrates a relationship in each column between a pixel unit, a readout circuit unit, an analog-to-digital conversion unit, and a memory unit according to a second exemplary embodiment.

FIG. 7 illustrates a relationship in each column between the pixel unit 104, the readout circuit unit 105, the analog-to-digital conversion unit 107, and the memory unit 109 according to the present exemplary embodiment.

The pixel unit 104 has two vertical output lines 208 for one pixel row. The vertical scanning unit 103 sequentially selects pixels P arranged in a matrix form every two rows. The simultaneously selected two rows are connected to different vertical output lines. The vertical output lines to which odd-number rows are connected are connected to the readout circuit 401, the comparison circuit 402, and the memory block 901. The vertical output lines to which even-number rows are connected are connected to the readout circuit 401, the comparison circuit 402, and the memory block 902.

<Memory Blocks>

Figure 8:
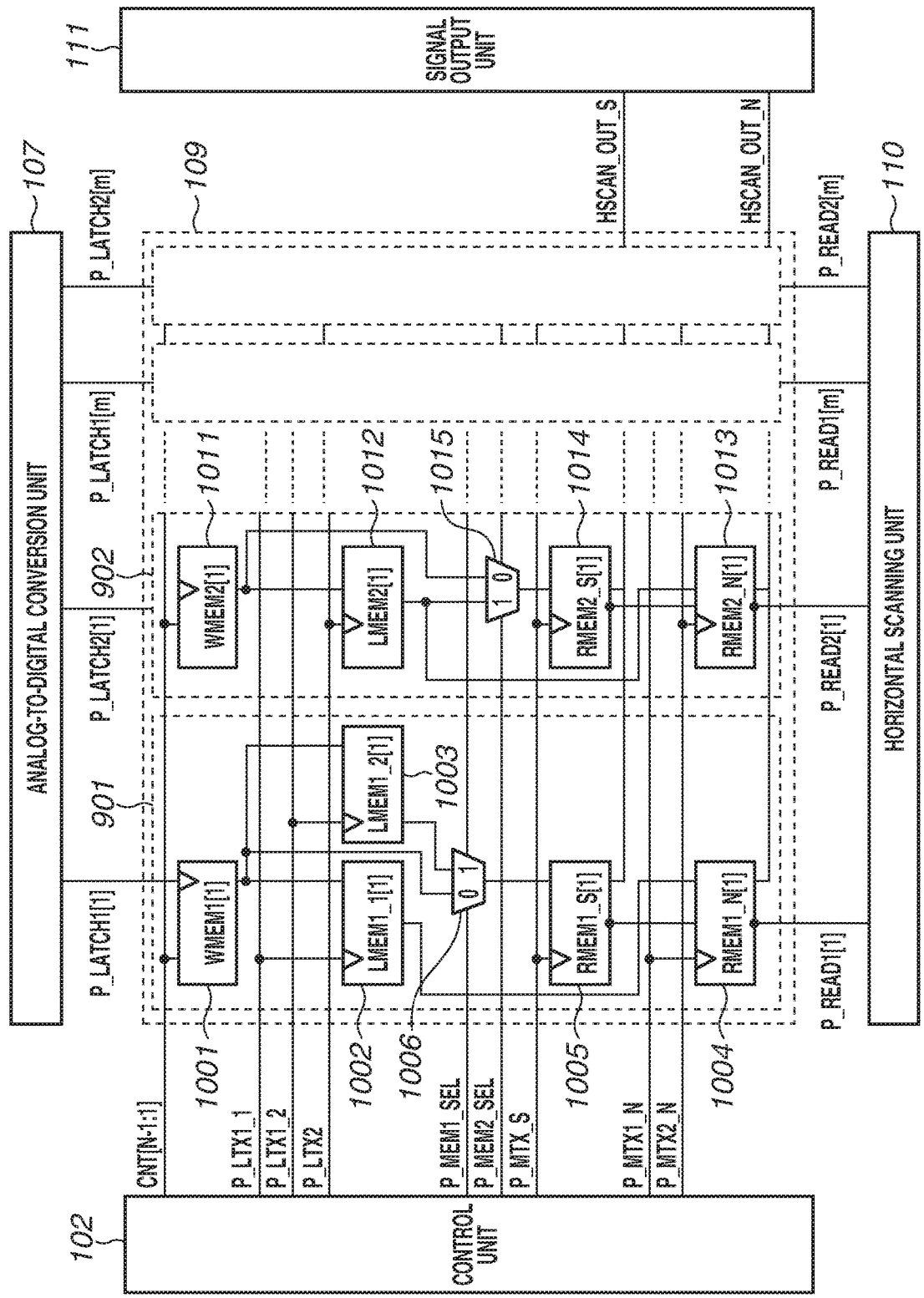
FIG. 8 illustrates an example of configurations of memory blocks according to the second exemplary embodiment.

FIG. 8 illustrates an example of configurations of the memory blocks 901 and 902 according to the present exemplary embodiment.

The memory block 901 includes a first memory 1001, a second memory 1002, a third memory 1003, a fourth memory 1004, a fifth memory 1005, and a selection circuit 1006. Digital signals held in the first memory 1001, the second memory 1002, and the third memory 1003 are referred to as a digital signal WMEM1, a digital signal LMEM1_1, and a digital signal LMEM1_2, respectively. Digital signals held in the fourth memory 1004 and the fifth memory 1005 are referred to as a digital signal RMEM1_N and a digital signal RMEM1_S, respectively. For example, each of the first memory 1001 to the fifth memory 1005 can be formed of a latch circuit.

According to a comparison result signal P_LATCH1, the first memory 1001 holds as the digital signal WMEM1 the count signal CNT output from the counter 108. The output terminal of the first memory 1001 is connected to the input terminals of the second memory 1002, the third memory 1003, and the selection circuit 1006.

According to a first transfer control signal P_LTX1_1, the digital signal WMEM1 held in the first memory 1001 is transferred to and held in the second memory 1002 as the digital signal LMEM1_1. The output terminal of the second memory 1002 is connected to the input terminal of the fourth memory 1004.

According to a second transfer control signal P_LTX1_2, the digital signal WMEM1 held in the first memory 1001 is transferred to and held in the third memory 1003 as the digital signal LMEM1_2. The output terminal of the third memory 1003 is connected to the input terminal of the selection circuit 1006.

According to a third transfer control signal P_MTX1_N, the digital signal LMEM1_1 held in the second memory 1002 is transferred to and held in the fourth memory 1004 as the digital signal RMEM1_N. The fourth memory 1004 outputs the digital signal to the first output signal line HSCAN_OUT_N according to a readout control signal P_READ1 output from the horizontal scanning unit 110 to each column.

When the fourth memory 1004 is not selected by the readout control signal P_READ1, the output terminal of the fourth memory 1004 connected to the first output signal line HSCAN_OUT_N is set to the high-impedance state. More specifically, according to the readout control signal P_READ1, the fourth memory 1004 is able to output three different values (high level, low level, and high-impedance state) to the first output signal line HSCAN_OUT_N.

According to the fourth transfer control signal P_MTX_S, either one of the first memory 1001 and the third memory 1003 is selected by the selection circuit 1006, and the digital signal held in the selected memory is transferred to and held in the fifth memory 1005 as the digital signal RMEM1_S.

The output terminal of the selection circuit 1006 is connected to the input terminal of the fifth memory 1005.

According to the readout control signal P_READ1 output from the horizontal scanning unit 110 to each column, the fifth memory 1005 outputs the digital signal to the second output signal line HSCAN_OUT_S. Similarly to the fourth memory 1004, according to the readout control signal P_READ1, the fifth memory 1005 is also able to output three different values (high level, low level, and high-impedance state) to the second output signal line HSCAN_OUT_S. The first memory 1001, the second memory 1002, the third memory 1003, and the fourth memory 1004 may be able to output the three different values or output two different values (high level and low level).

According to the first selection signal P_MEM1_SEL, the selection circuit 1006 selects either one of the first memory 1001 and the third memory 1003 and outputs the digital signal held in the selected memory to the fifth memory 1005.

The memory block 902 includes a sixth memory 1011, a seventh memory 1012, an eighth memory 1013, a ninth memory 1014, and a selection circuit 1015. Digital signals held in the sixth memory 1011, the seventh memory 1012, the eighth memory 1013, and the ninth memory 1014 are referred to as a digital signal WMEM2, a digital signal LMEM2, a digital signal RMEM2_N and a digital signal RMEM2_S, respectively. For example, each of the sixth memory 1011 to the ninth memory 1014 can be formed of a latch circuit.

According to a comparison result signal P_LATCH2, the count signal CNT output from the analog-to-digital conversion unit 107 is transferred to and held in the sixth memory 1011 as the digital signal WMEM2. The output terminal of the sixth memory 1011 is connected to the input terminals of the seventh memory 1012 and the selection circuit 1015.

According to the fifth transfer control signal P_LTX2, the digital signal WMEM2 held in the sixth memory 1011 is transferred to and held in the seventh memory 1012 as the digital signal LMEM2. The output terminal of the seventh memory 1012 is connected to the input terminals of the eighth memory 1013 and the selection circuit 1015.

According to sixth transfer control signal P_MTX2_N, the digital signal held in the seventh memory 1012 is transferred to and held in the eighth memory 1013 as the digital signal RMEM2_N. According to a readout control signal P_READ2 output from the horizontal scanning unit 110 to each column, the eighth memory 1013 outputs the digital signal to the first output signal line HSCAN_OUT_N.

When the eighth memory 1013 is not selected by the readout control signal P_READ2, the output terminal of the eighth memory 1013 connected to the first output signal line HSCAN_OUT_N is set to the high-impedance state. More specifically, according to readout control signal P_READ2, the eighth memory 1013 is able to output three different values (high level, low level, and high-impedance state) to the first output signal line HSCAN_OUT_N.

According to the fourth transfer control signal P_MTX_S, the digital signal held in the memory selected by the selection circuit 1015 is transferred to and held in the ninth memory 1014 as the digital signal RMEM2_S. According to the readout control signal P_READ2 output from the horizontal scanning unit 110 to each column, the ninth memory 1014 outputs the digital signal to the second output signal line HSCAN_OUT_S. Similarly to the eighth memory 1013, according to the readout control signal P_READ2, the ninth memory 1014 is able to output three different values (high level, low level, and high-impedance state) to the second output signal line HSCAN_OUT_S.

The sixth memory 1011 and the seventh memory 1012 may be able to output the three different values or output two different values (high level and low level).

According to the second selection signal P_MEM2_SEL, the selection circuit 1015 selects either one of the sixth memory 1011 and the seventh memory 1012 and outputs the digital signal held in the selected memory.

<Driving Method>

Figure 9B:
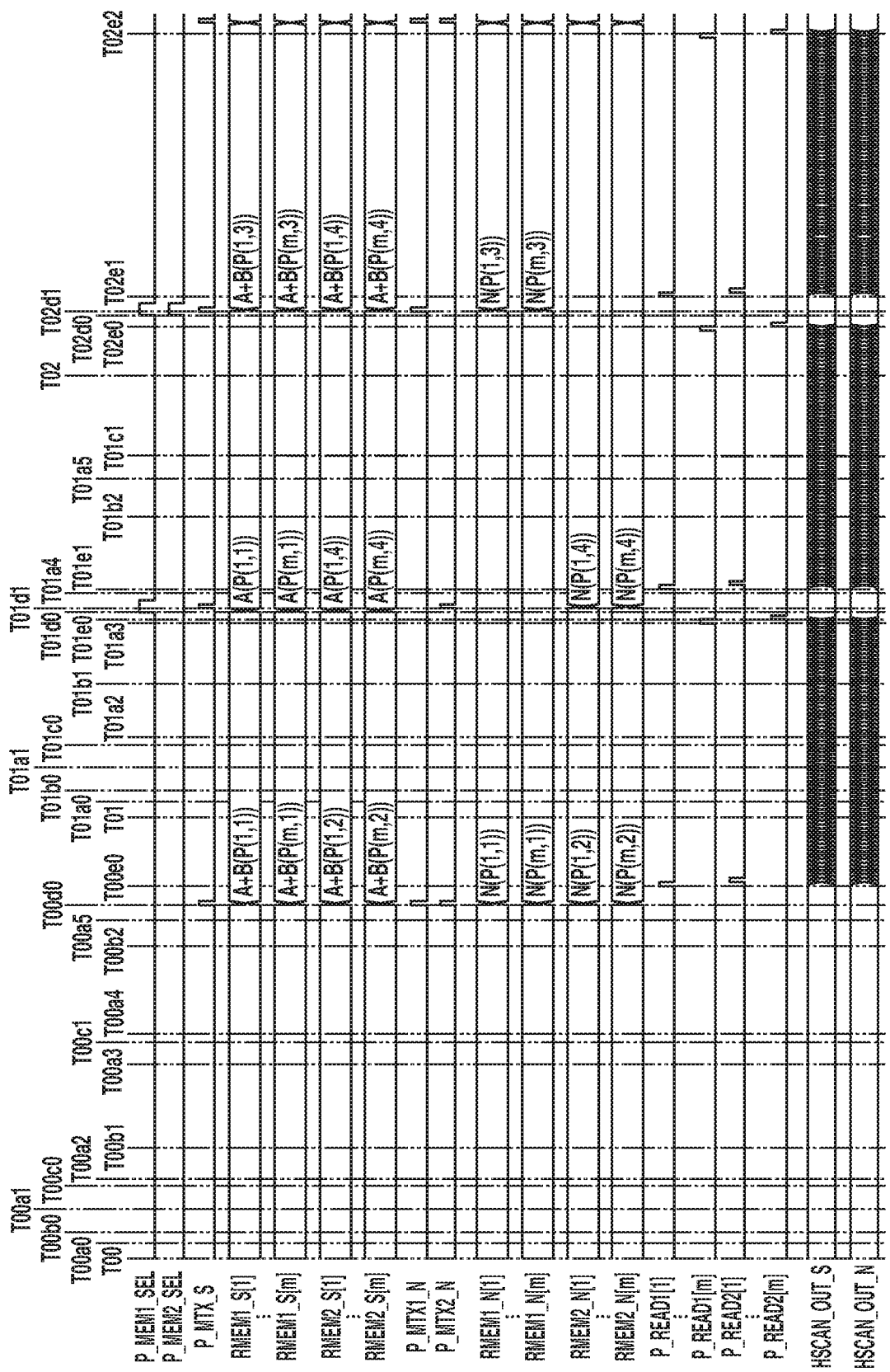
FIG. 9 (consisting of FIGS. 9A and 9B) is a timing chart illustrating an example of operations of the analog-to-digital conversion unit and the memory unit according to the second exemplary embodiment.

FIG. 9 (consisting of FIGS. 9A and 9B) is a timing chart illustrating an example of operations of the analog-to-digital conversion unit 107 and the memory unit 109 illustrated in FIG. 8.

At a time T00, the CPU 101 instructs the control unit 102 to set the horizontal synchronization signal HD to the high level.

At a time T00$a$0, the counter 108 starts counting, the reference signal generation unit 106 starts generating the reference signal VRAMP, and the analog-to-digital conversion unit 107 starts the analog-to-digital conversion on pixels in rows 1 and 2 of the pixel unit 104. The output signals SIG_OUT1 and SIG_OUT2 used At this time are the noise signals (N) of the pixel unit 104 and the readout circuit unit 105 in the reset state, respectively.

At a time T00$b$0, the output signal SIG_OUT1 of the pixel(1,1) in column 1 of row 1 of the pixel unit 104 coincides with the reference signal VRAMP, and a comparison result signal P_LATCH1[1] is output. At this time, the count value (N(P(1, 1))) at the time T00$b$0 is held in the first memory 1001 as the digital signal WMEM1[1]. In a similar manner, the analog-to-digital conversion unit 107 also performs the analog-to-digital conversion on pixels in columns 2 to m of row 1 and pixels in columns 1 to m of row 2.

At a time T00$a$1, the counter 108 ends counting, and the analog-to-digital conversion unit 107 ends the analog-to-digital conversion on all of the pixel signals in rows 1 and 2 and the noise signal of the readout circuit unit 105 in the reset state.

At a time T00$c$0, the control unit 102 sets the transfer control signals P_LTX1_1 and P_LTX2 to the high level. In response thereto, the digital signal WMEM1 held in the first memory 1001 of each column is transferred to the second memory 1002 of each column, and the digital signal WMEM2 held in the sixth memory 1011 of each column is transferred to the seventh memory 1012 of each column.

At a time T00$a$2, the counter 108 starts counting, the reference signal generation unit 106 starts generating the reference signal VRAMP, and the analog-to-digital conversion unit 107 starts the analog-to-digital conversion on pixels in rows 1 and 2 of the pixel unit 104. The output signals SIG_OUT1 and SIG_OUT2 used At this time are the signal (A) based on the photoelectric conversion portion 201 of the pixel unit 104 (not based on the photoelectric conversion portion 203 thereof). This signal is referred to as a first pixel signal.

At a time T00$b$1, the output signal SIG_OUT1 of the pixel(1,1) in column 1 of row 1 of the pixel unit 104 coincides with the reference signal VRAMP, and the comparison result signal P_LATCH1[1] is output. At this time, the count value (A(P(1, 1))) at the time T00$b$1 is held in the first memory 1001 as the digital signal WMEM1[1]. In a similar manner, the analog-to-digital conversion unit 107 also performs the analog-to-digital conversion on pixels in columns 2 to m of row 1 and pixels in columns 1 to m of row 2.

At a time T00a3, the counter 108 ends counting, and the analog-to-digital conversion unit 107 ends the analog-to-digital conversion on the first pixel signals in rows 1 and 2.

At a time T00c1, the control unit 102 sets the transfer control signal P_LTX1_2 to the high level, and the digital signal WMEM1 held in the first memory 1001 of each column is transferred to the third memory 1003 of each column. The third memory 1003 holds the digital signal as the digital signal LMEM1_2. At this time, the digital signal LMEM1_2 held in the third memory 1003 is the digital signal (A) based on the first pixel signal.

At a time T00a4, the counter 108 starts counting, the reference signal generation unit 106 starts generating the reference signal VRAMP, and the analog-to-digital conversion unit 107 starts the analog-to-digital conversion on pixels in rows 1 and 2 of the pixel unit 104. The output signals SIG_OUT1 and SIG_OUT2 used at this time are the signal (A+B) which is the sum of the signal based on the photoelectric conversion portion 201 of the pixel unit 104 and the signal based on the photoelectric conversion portion 203 thereof. This signal is referred to as a second pixel signal.

At a time T00b2, the output signal SIG_OUT1 of the pixel P(1, 1) of the pixel unit 104 coincides with the reference signal VRAMP, and the comparison result signal P_LATCH1[1] is output. At this time, the first memory 1001 holds the count value (A+B(P(1, 1))) at the time T00b2 as a digital signal WMEM1[0]. In a similar manner, the analog-to-digital conversion unit 107 also performs the analog-to-digital conversion on pixels in columns 2 to m of row 1 and pixels in columns 1 to m of row 2.

At a time T00a5, the counter 108 ends counting, and the analog-to-digital conversion unit 107 ends the analog-to-digital conversion on all of the second pixel signals in rows 1 and 2.

At a time T00d0, the control unit 102 sets the transfer control signals P_MTX_N and P_MTX_S to the high level. In response thereto, the digital signal LMEM1_1 held in the second memory 1002 of each column is transferred to and held in the fourth memory 1004 of each column as the digital signal RMEM1_N. The digital signal LMEM2 held in the seventh memory 1012 of each column is transferred to and held in the eighth memory 1013 of each column as the digital signal RMEM2_N.

Further, the digital signal WMEM1 held in the first memory 1001 of each column is transferred to and held in the fifth memory 1005 of each column as the digital signal RMEM1_S. The digital signal WMEM2 held in the sixth memory 1011 of each column is transferred to and held in the ninth memory 1014 of each column as the digital signal RMEM2_S. At this time, the digital signals RMEM1_S and RMEM2_S held in the fifth memory 1005 and the ninth memory 1014, respectively, are the digital signal (A+B) based on the second pixel signal.

At a time T00e0, the horizontal scanning unit 110 sets the readout control signal P_READ1[1] in column 1 of row 1 to the high level. In response thereto, the digital signal RMEM1_N[1] is output to the signal output unit 111 via the output signal line HSCAN_OUT_N, and the digital signal RMEM1_S[1] is output to the signal output unit 111 via the output signal line HSCAN_OUT_S.

In a similar manner, in the subsequent time period until the time T01e0, the output signals from the memory block 901 and the output signals from the memory block 902 are alternately output to the signal output unit 111. More specifically, the digital signals held in the fourth memory 1004 and the fifth memory 1005 and the digital signals held in the eighth memory 1013 and the ninth memory 1014 are alternately output to the signal output unit 111. The digital signals RMEM1_S and RMEM2_S read in this time period are the digital signals (A+B) based on the second pixel signal.

At a time T01, the CPU 101 instructs the control unit 102 to set the horizontal synchronization signal HD to the high level.

At a time T01a0, the counter 108 starts counting, the reference signal generation unit 106 starts generating the reference signal VRAMP, and the analog-to-digital conversion unit 107 starts the analog-to-digital conversion on pixels in rows 3 and 4 of the pixel unit 104. The output signals SIG_OUT1 and SIG_OUT2 used at this time are the noise signal (N) of the pixel unit 104 and the readout circuit unit 105 in the reset state, respectively.

At a time T01b0, the output signal SIG_OUT1 of the pixel P(1, 3) in column 1 of row 3 of the pixel unit 104 coincides with the reference signal VRAMP, and the comparison result signal P_LATCH1[1] is output. At this time, the count value (N(P(1, 3))) at the time T01b0 is held in the first memory 1001 as the digital signal WMEM1[1]. In a similar manner, the analog-to-digital conversion unit 107 also performs the analog-to-digital conversion on pixels in columns 2 to m of row 3 and pixels in columns 1 to m of row 4.

At a time T01a1, the counter 108 ends counting, and the analog-to-digital conversion unit 107 ends the analog-to-digital conversion on all of the pixel signals in rows 3 and 4 and the noise signal of the readout circuit units 105 in the reset state.

At a time T01c0, the control unit 102 sets the transfer control signals P_LTX1_1 and P_LTX2 to the high level. In response thereto, the digital signal WMEM1 held in the first memory 1001 of each column is transferred to and held in the second memory 1002 of each column as the digital signal LMEM1_1. The digital signal WMEM2 held in the sixth memory 1011 of each column is transferred to and held in the seventh memory 1012 of each column as the digital signal LMEM2.

At a time T01a2, the counter 108 starts counting, the reference signal generation unit 106 starts generating the reference signal VRAMP, and the analog-to-digital conversion unit 107 starts the analog-to-digital conversion on pixels in rows 3 and 4 of the pixel unit 104. The output signals SIG_OUT1 and SIG_OUT2 used at this time are the signal (A) based only on the photoelectric conversion portion 201 of the pixel unit 104. This signal is referred to as a third pixel signal.

At a time T01b1, the output signal SIG_OUT1 of the pixel P(1, 3) of the pixel unit 104 coincides with the reference signal VRAMP, and the comparison result signal P_LATCH1[1] is output. At this time, a count value (A(P(1, 3))) at the time T01b1 is held in the first memory 1001 as the digital signal WMEM1[1]. In a similar manner, the analog-to-digital conversion unit 107 also performs the analog-to-digital conversion on pixels in columns 2 to m of row 3 and pixels in columns 1 to m of row 4.

At a time T01a3, the counter 108 ends counting, and the analog-to-digital conversion unit 107 ends the analog-to-digital conversion on all of the third pixel signals in rows 3 and 4.

At a time T01d0, the control unit 102 sets the selection signal P_MEM1_SEL to the high level. At this time, the selection circuit 1006 selects the third memory 1003, and the digital signal LMEM1_2 held in the third memory 1003 is selected.

At a time T01*d*1, the control unit 102 sets the transfer control signals P_MTX_S and P_MTX2_N to the high level. In response thereto, the digital signal LMEM1_2 held in the third memory 1003 selected by the selection circuit 1006 of each column is transferred to and held in the fifth memory 1005 of each column as the digital signal RMEM1_S. The digital signal WMEM2 held in the sixth memory 1011 of each column is transferred to and held in the ninth memory 1014 of each column as the digital signal RMEM2_S. Further, the digital signal LMEM2 held in the seventh memory 1012 of each column is transferred to and held in the eighth memory 1013 of each column as the digital signal RMEM2_N.

At this time, the digital signal RMEM1_S held in the fifth memory 1005 is the digital signal based on the first pixel signal, and the digital signal RMEM2_S held in the ninth memory 1014 is the digital signal (A) based on the third pixel signal.

At a time T01*a*4, the counter 108 starts counting, the reference signal generation unit 106 starts generating the reference signal VRAMP, and the analog-to-digital conversion unit 107 starts the analog-to-digital conversion on pixels in rows 3 and 4 of the pixel unit 104. The output signals SIG_OUT1 and SIG_OUT2 used at this time are the signal (A+B), which is the sum of the signal based on the photoelectric conversion portion 201 of the pixel unit 104 and the signal based on the photoelectric conversion portion 203 thereof. This signal is referred to as a fourth pixel signal.

At a time T01*e*1, the horizontal scanning unit 110 sets the readout control signal P_READ1[1] for column 1 of row 3 to the high level. In response thereto, the digital signal RMEM1_N[1] held in the fourth memory 1004 is output to the signal output unit 111 via the output signal line HSCAN_OUT_N. The digital signal RMEM1_S[1] held in the fifth memory 1005 is output thereto via the HSCAN_OUT_S. In a similar manner, in the subsequent time period until the time T02*e*0, the digital signals held in the memory blocks 901 and 902 are alternately output to the signal output unit 111. More specifically, the digital signals held in the fourth memory 1004 and the fifth memory 1005 and the digital signals held in the eighth memory 1013 and the ninth memory 1014 are alternately output to the signal output unit 111. The digital signal RMEM1_S held in the fifth memory 1005 and read in this time period is the digital signal (A) based on the first pixel signal, and the digital signal RMEM2_S held in the ninth memory 1014 is the digital signal (A) based on the third pixel signal.

At a time T01*b*2, the output signal SIG_OUT1 of the pixel P(1, 3) of the pixel unit 104 coincides with the reference signal VRAMP, and the comparison result signal P_LATCH1[1] is output. At this time, a count value (A+B (P(1, 3))) at the time T01*b*2 is held in the first memory 1001 as the digital signal WMEM1[1]. In a similar manner, the analog-to-digital conversion unit 107 also performs the analog-to-digital conversion on pixels in columns 2 to m of row 3 and pixels in columns 1 to m, row 4.

At a time T01*a*5, the counter 108 ends counting, and the analog-to-digital conversion unit 107 ends the analog-to-digital conversion on all of the fourth pixel signals in rows 3 and 4.

At a time T01*c*1, the control unit 102 sets the transfer control signals P_LTX1_2 and P_LTX2 to the high level. In response thereto, the digital signal WMEM1 held in the first memory 1001 of each column is transferred to and held in the third memory 1003 of each column as the digital signal LMEM1_2. The digital signal WMEM2 held in the sixth memory 1011 of each column is transferred to and held in the seventh memory 1012 of each column as the digital signal LMEM2. At this time, the digital signals LMEM1_2 and LMEM2 held in the third memory 1003 and the seventh memory 1012, respectively, are digital signals based on the fourth pixel signal.

At a time T02, the CPU 101 instructs the control unit 102 to set the horizontal synchronization signal HD to the high level.

At a time T02*d*0, the control unit 102 sets the selection signals P_MEM1_SEL and P_MEM2_SEL to the high level. At this time, the selection circuit 1006 selects the third memory 1003, and the selection circuit 1015 selects the seventh memory 1012.

At a time T02*d*1, the control unit 102 sets the transfer control signals P_MTX_S and P_MTX1_N to the high level. In response thereto, the digital signal LMEM1_1 held in the second memory 1002 is transferred to and held in the fourth memory 1004 of each column as the digital signal RMEM1_N. The digital signal LMEM1_2 held in the third memory 1003 selected by the selection circuit 1006 of each column is transferred to and held in the fifth memory 1005 of each column as the digital signal RMEM1_S. The digital signal LMEM2 held in the seventh memory 1012 selected by the selection circuit 1015 of each column is transferred to and held in the ninth memory 1014 of each column as the digital signal RMEM2_S.

At this time, the digital signals RMEM1_S and RMEM2_S held in the fifth memory 1005 and the ninth memory 1014, respectively, are the digital signal (A+B) based on the fourth pixel signal.

At a time T02*e*1, the horizontal scanning unit 110 sets the readout control signal P_READ1[1] in column 1 of row 3 to the high level. In response thereto, the digital signal RMEM1_N[1] held in the fourth memory 1004 is output to the signal output unit 111 via the output signal line HSCAN_OUT_N, and the digital signal RMEM1_S[1] held in the ninth memory 1014 is output to the signal output unit 111 via the output signal line HSCAN_OUT_S.

In a similar manner, in the subsequent time period until the time T02*e*2, the digital signals held in the memory blocks 901 and 902 are alternately output to the signal output unit 111. More specifically, the digital signals RMEM1_N and RMEM1_S held in the fourth memory 1004 and the fifth memory 1005, respectively, and the digital signals RMEM2_N and RMEM2_S held in the eighth memory 1013 and the ninth memory 1014, respectively, are alternately output to the signal output unit 111. The digital signals RMEM1_S and RMEM2_S held in the fifth memory 1005 and the ninth memory 1014, respectively, and read in this time period are digital signals based on the fourth pixel signal.

Subsequently, the CPU 101 alternately performs the operation between the time T00 and the time T01 and the operation between the time T01 and the time T02.

According to the present exemplary embodiment, the first analog-to-digital conversion period indicates the time period between the time T00*a*2 and the time T00*a*3 and the time period between the time T01*a*2 and the time T01*a*3. In addition, the second analog-to-digital conversion period indicates the time period between the time T00*a*4 and the time T00*a*5 and the time period between the time T01*a*4 and the time T01*a*5. The first horizontal period indicates the time period between the time T00 and the time T01. The second horizontal period indicates the time period between the time T01 and the time T02.

According to the present exemplary embodiment, the analog-to-digital conversion is also performed on output signals from pixels in pixel rows with which only the image forming signal is output from the memory unit 109. In other words, the analog-to-digital conversion is performed on output signals from all pixels of the pixel unit 102. Therefore, it is possible to reduce or eliminate the difference in charge accumulation time in the photoelectric conversion portion 201 for the image forming signal between a pixel row performing both focus detection and image formation and a pixel row performing only image formation. As a result, the difference in luminance between rows of the pixel unit 102, i.e., level differences, can be reduced in the formed image, thus acquiring a smooth image.

According to the present exemplary embodiment, in row 1, both the digital signal corresponding to the first pixel signal based on the output of the photoelectric conversion portion 201 and the digital signal corresponding to the second pixel signal based on the outputs of the photoelectric conversion portions 201 and 203 are output from the fifth memory 1005 to the signal output unit 111. On the other hand, in row 2, the digital signal corresponding to the fourth pixel signal based on the outputs of the photoelectric conversion portions 201 and 203 is output from the ninth memory 1014, but the digital signal corresponding to the third pixel signal based on the output of the photoelectric conversion portion 201 is not output. This means that the output of the digital signal based on the third pixel signal can be eliminated.

The present exemplary embodiment further includes the second memory 1002 and the selection circuits 1006 and 1015. Thus, for example, at the time T00c1, the digital signal based on the first pixel signal can be held in the third memory 1003. This makes it possible to delay the timing when the fifth memory 1005 holds the digital signal based on the first pixel signal and accordingly to delay the timing when the memory unit 109 starts outputting the digital signal based on the second pixel signal to the signal output unit 111. This allows the memory unit 109 to output the digital signal based on the second pixel signal in a time period produced by not outputting the digital signal based on the third pixel signal.

According to the present exemplary embodiment, during the time period between the time T01d0 and the time T02d1, the digital signal corresponding to the first pixel signal and the digital signal corresponding to the third pixel signal are output from the fifth memory 1005 and the ninth memory 1014, respectively, to the signal output unit 111. From the time T02d1 on, the digital signal corresponding to the fourth pixel signal is output from the fifth memory 1005 and the ninth memory 1014 to the signal output unit 111.

As a result, the time period between the time T00a5 and the time T00e0 is different from the time period between the time T01a5 and the time T02e1. At the time T00a5, the analog-to-digital conversion on the second pixel signals in rows 1 and 2 is completed. At the time T00e0, the output of the digital signal based on the second pixel signal to the signal output unit 111 is started. At the time T01a5, the analog-to-digital conversion on the fourth pixel signals in rows 3 and 4 is completed. At the time T02e1, the output of the digital signal based on the fourth pixel signal to the signal output unit 111 is started.

The interval at which the horizontal scanning unit 110 outputs the readout signal P_READ becomes constant in the time period between the start of the first horizontal period (T00) and the end of the second horizontal period (T02).

In this way, the present exemplary embodiment makes it possible to output digital signals from the memory unit 109 to the signal output unit 111 at fixed intervals in two continuous horizontal periods. More specifically, a time period produced by not outputting the digital signal based on the third pixel signal from the memory unit 109 to the output signal lines is allocated as a transfer time for other digital signals. Therefore, sufficient time can be used to transfer each piece of data even if there is a large number of data. This makes it possible not only to ensure reliability in digital signal transfer but also to restrict the increase in circuit scale.

According to the present exemplary embodiment, it is possible to eliminate the output of the digital signal based on the first pixel signal of a row and the digital signal based on the third pixel signal of another row. Therefore, for example, when the first and the second pixel signals are pixel signals for red pixels, and the third and the fourth pixel signals are pixel signals for green pixels, the data output of red and green pixels can be respectively reduced.

For example, focus detection and image formation can be performed by using digital signals from the solid-state imaging device according to the present exemplary embodiment. In this case, in addition to the digital signal RMEM_N for noise rejection, a digital signal based on the signals from pixels P of all rows is output as the image forming (imaging) digital signal RMEM_S. On the other hand, although focus detection may be performed based on signals from all of pixels arranged in a matrix form, it is sufficient to perform focus detection based on some pixels.

In the above-described exemplary embodiment, a row including pixels for outputting both the focus detection digital signal and the image forming digital signal to an output signal line is arranged adjacently to a row including pixels for outputting only the image forming digital signal thereto. In other words, pixels for outputting both the focus detection digital signal and the image forming digital signal to an output signal line are arranged adjacently to pixels for outputting only the image forming digital signal thereto in the row direction.

In a solid-state imaging device including the different number of output digital signals for each row, applying the present exemplary embodiment enables efficient digital signal transfer without generating a time period during which signals are not output due to the different number of output signals. Even if the number of digital signals to be output from the memory unit 109 to the signal output unit 111 increases because of the increase in the number of pixels and the necessity of outputting various data including noise rejection data, focus detection data, and imaging data, this configuration makes it possible not only to ensure reliability in digital signal transfer but also to restrict the increase in circuit scale.

A third exemplary embodiment will be described below centering on differences from the first exemplary embodiment, and descriptions of portions having similar configurations, functions, and effects to those according to the first exemplary embodiment will be omitted.

<Memory Blocks>

FIG. 10 illustrates an example of a configuration of the memory block 403 according to the present exemplary embodiment. The memory block 403 includes a first memory 1201, a second memory 1202, a third memory 1203, and a fourth memory 1204. The digital signals held in the first memory 1201, the second memory 1202, the third memory 1203, and the fourth memory 1204 are referred to as digital signals WMEM, LMEM, RMEM_N, and RMEM_S, respectively. For example, each of the first memory 1001 to the fourth memory 1204 may be formed of a latch circuit.

According to the comparison result signal P_LATCH, the first memory 1201 holds as the digital signal WMEM the count signal CNT output from the counter 108. The output terminal of the first memory 1201 is connected to the input terminal of the second memory 1202.

According to first transfer control signal P_LTX, the digital signal WMEM held in the first memory 1201 is transferred to and held in the second memory 1202 as the digital signal LMEM. The output terminal of the second memory 1202 is connected to the input terminals of the third memory 1203 and the fourth memory 1204.

According to second transfer control signal P_MTX_N, the digital signal LMEM held in the second memory 1202 is transferred to and held in the third memory 1203 as the digital signal RMEM_N. The third memory 1203 is connected to the second memory 1202, and a write path is disposed between the second memory 1202 and the third memory 1203. According to the readout control signal P_READ output from the horizontal scanning unit 110 to each column, the third memory 1203 outputs the digital signal RMEM_N to the first output signal line HSCAN_OUT_N.

When the third memory 1203 is not selected by the readout control signal P_READ, the output terminal of the third memory 1203 connected to the first output signal line HSCAN_OUT_N is set to the high-impedance state. More specifically, according to the readout control signal P_READ, the third memory 1203 is able to output three different values (high level, low level, and high-impedance state) to the first output signal line HSCAN_OUT_N.

According to the third transfer control signal P_MTX_S, the digital signal LMEM held in the second memory 1202 is transferred to and held in the fourth memory 1204 as the digital signal RMEM_S. According to the readout control signal P_READ output from the horizontal scanning unit 110 to each column, the fourth memory 1204 outputs the digital signal RMEM_S to the second output signal line HSCAN_OUT_S. Similarly to the third memory 1203, according to the readout control signal P_READ, the fourth memory 1204 is also able to output three different states (high level, low level, and high-impedance state) to the second output signal line HSCAN_OUT_S.

The first memory 1201 and the second memory 1202 may be able to output the three different values or output two different values (high level and low level).

<Driving Method>

Figure 11:
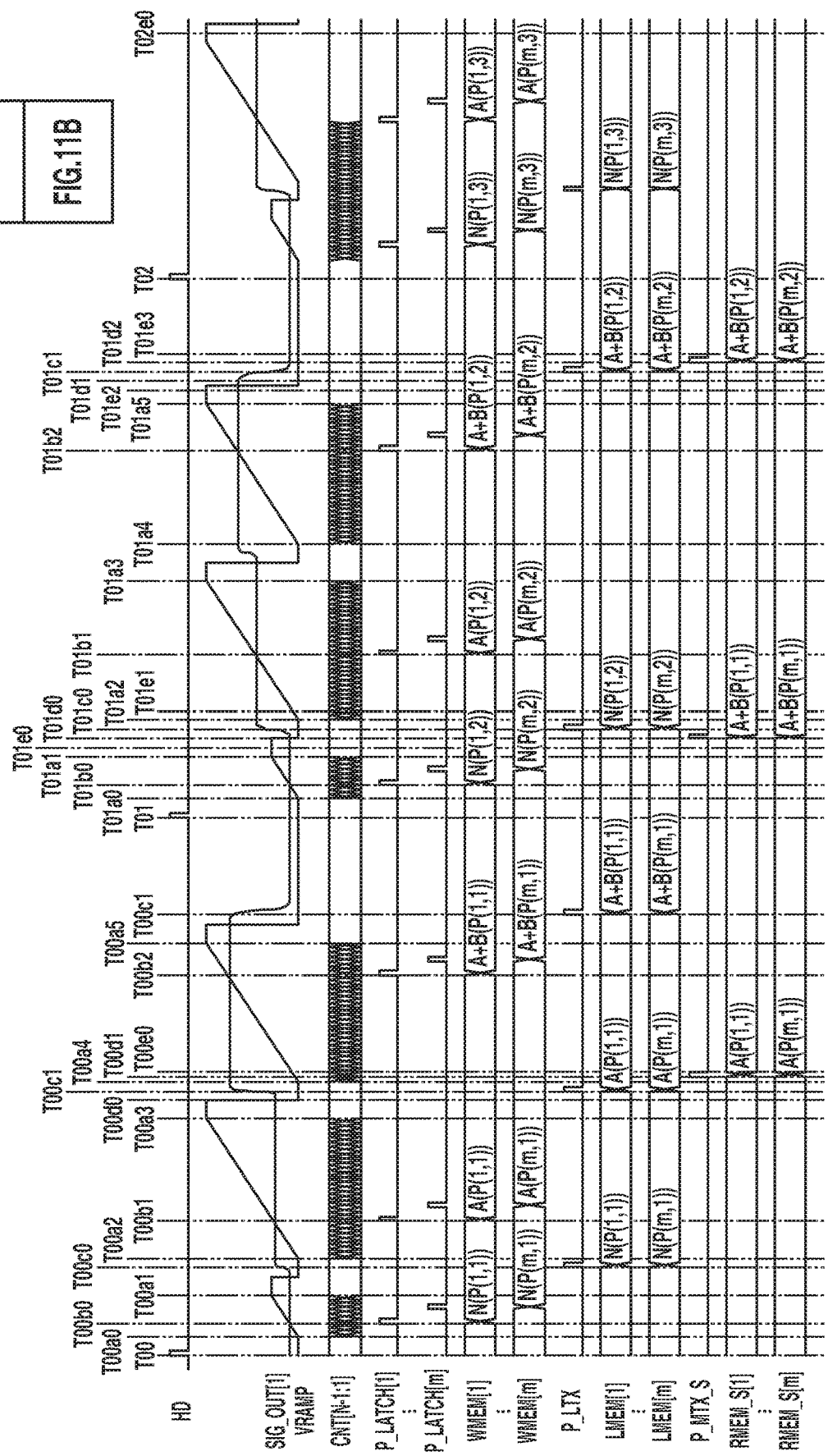
FIG. 11 (consisting of FIGS. 11A and 11B) is a timing chart illustrating an example of operations of an analog-to-digital conversion unit and a memory unit according to the third exemplary embodiment.

FIG. 11 (consisting of FIGS. 11A and 11B) is a timing chart illustrating an example of operations of the analog-to-digital conversion unit 107 and the memory unit 109 illustrated in FIG. 10.

At a time T00, the CPU 101 instructs the control unit 102 to set the horizontal synchronization signal HD to the high level.

At a time T00a0, the counter 108 starts counting, the reference signal generation unit 106 starts generating the reference signal VRAMP, and the analog-to-digital conversion unit 107 starts the analog-to-digital conversion on pixels in row 1 of the pixel unit 104. The output signal SIG_OUT used at this time is the noise signal (N) of the pixel unit 104 and the readout circuit unit 105 in the reset state.

At a time T00b0, the output signal SIG_OUT of the pixel P(1, 1) in column 1 of row 1 of the pixel unit 104 coincides with the reference signal VRAMP, and the comparison result signal P_LATCH[1] is output. At this time, the count value (N(P(1, 1))) at the time T00b0 is held in the first memory 1201 as the digital signal WMEM[1]. In a similar manner, the analog-to-digital conversion unit 107 also performs the analog-to-digital conversion on pixels in columns 2 to m of row 1.

At a time T00a1, the counter 108 ends counting, and the analog-to-digital conversion unit 107 ends the analog-to-digital conversion on all of the pixel signals in row 1 and the noise signal of the readout circuit units 105 in the reset state.

At a time T00c0, the control unit 102 sets the transfer control signal P_LTX to the high level. The digital signal WMEM held in the first memory 1201 of each column is transferred to and held in the second memory 1202 of each column as the digital signal LMEM.

At a time T00a2, the counter 108 starts counting, the reference signal generation unit 106 starts generating the reference signal VRAMP, and the analog-to-digital conversion unit 107 starts the analog-to-digital conversion on pixels in row 1 of the pixel unit 104. The output signal SIG_OUT used at this time is the signal (A) based on the photoelectric conversion portion 201 of the pixel unit 104 (not based on the photoelectric conversion portion 202 thereof). This signal is referred to as a first pixel signal.

At a time T00b1, the output signal SIG_OUT of the pixel P(1, 1) of the pixel unit 104 coincides with the reference signal VRAMP, and the comparison result signal P_LATCH[1] is output. At this time, the count value (A(P(1, 1))) at the time T00b1 is held in the second memory 1201 as the digital signal WMEM[1]. In a similar manner, the analog-to-digital conversion unit 107 also performs the analog-to-digital conversion on pixels in columns 2 to m of row 1.

At a time T00a3, the counter 108 ends counting, and the analog-to-digital conversion unit 107 ends the analog-to-digital conversion on the first pixel signals in row 1.

At a time T00d0, the control unit 102 sets the transfer control signal P_MTX_N to the high level. In response thereto, the digital signal LMEM held in the second memory 1202 of each column is transferred to and held in the third memory 1203 of each column as the digital signal RMEM_N.

At a time T00c1, the control unit 102 sets the transfer control signal P_LTX to the high level. In response thereto, the digital signal WMEM held in the first memory 1201 of each column is transferred to and held in the second memory 1202 of each column as the digital signal LMEM. At this time, the digital signal LMEM held in the second memory 1202 is the digital signal (A) based on the first pixel signal.

At a time T00a4, the counter 108 starts counting, the reference signal generation unit 106 starts generating the reference signal VRAMP, and the analog-to-digital conversion unit 107 starts the analog-to-digital conversion on pixels in row 1 of the pixel unit 104. The output signal SIG_OUT used at this time is the signal (A+B), which is the sum of the signal based on the photoelectric conversion portion 201 of the pixel unit 104 and the signal based on the photoelectric conversion portion 203 thereof. This signal is referred to as a second pixel signal.

At a time T00d1, the control unit 102 sets the transfer control signal P_MTX_S to the high level. In response thereto, the digital signal LMEM held in the second memory 1202 of each column is transferred to and held in the fourth memory 1204 of each column as the digital signal RMEM_S.

At a time T00e0, the horizontal scanning unit 110 sets the readout control signal P_READ[1] in column 1 to the high level. In response thereto, the digital signal RMEM_N[1] is output from the third memory 1203 to the signal output unit 111 via the output signal line HSCAN_OUT_N, and the digital signal RMEM_S[1] is output from the fourth memory 1204 thereto via the output signal line HSCAN_OUT_S. In a similar manner, in the subsequent time period until the time T01e0, the digital signal RMEM_N held in the third memory 1203 and the digital signal RMEM_S held in the fourth memory 1204 are output to the signal output unit 111. The digital signal RMEM_S held in the fourth memory 1204 and read in this time period is the digital signal (A) based on the first pixel signal.

At a time T00b2, the output signal SIG_OUT of the pixel P(1, 1) of the pixel unit 104 coincides with the reference signal VRAMP, and the comparison result signal P_LATCH [1] is output. At this time, the first memory 1201 holds the count value (A+B(P(1, 1))) at the time T00b2 as the digital signal WMEM[1]. In a similar manner, the analog-to-digital conversion unit 107 also performs the analog-to-digital conversion on pixels in columns 2 to m of row 1.

At a time T00a5, the counter 108 ends counting, and the analog-to-digital conversion unit 107 ends the analog-to-digital conversion on all of the second pixel signals in row 1.

At a time T00c1, the control unit 102 sets the transfer control signal P_LTX to the high level. In response thereto, the digital signal WMEM held in the first memory 1201 of each column is transferred to and held in the second memory 1202 of each column as the digital signal LMEM. At this time, the digital signal LMEM held in the second memory 1202 is the digital signal based on the second pixel signal.

At a time T01, the CPU 101 instructs the control unit 102 to set the horizontal synchronization signal HD to the high level.

At a time T01a0, the counter 108 starts counting, the reference signal generation unit 106 starts generating the reference signal VRAMP, and the analog-to-digital conversion unit 107 starts the analog-to-digital conversion on pixels in row 2 of the pixel unit 104. The output signal SIG_OUT used at this time is the noise signal (N) of the pixel unit 104 and the readout circuit unit 105 in the reset state.

At a time T01b0, the output signal SIG_OUT of the pixel P(1, 2) in column 1 of row 2 of the pixel unit 104 coincides with the reference signal VRAMP, and the comparison result signal P_LATCH[1] is output. At this time, the count value (N(P(1, 2))) at the time T01b0 is held in the first memory 1201 as the digital signal WMEM[1]. In a similar manner, the analog-to-digital conversion unit 107 also performs the analog-to-digital conversion on pixels in columns 2 to m of row 2.

At a time T01a1, the counter 108 ends counting, and the analog-to-digital conversion unit 107 ends the analog-to-digital conversion on all of the pixel signals in row 2 and the noise signal of the readout circuit units 105 in the reset state.

At a time T01d0, the control unit 102 sets the transfer control signal P_MTX_S to the high level. In response thereto, the digital signal LMEM held in the second memory 1202 of each column is transferred to and held in the fourth memory 1204 of each column as the digital signal RMEM_S. At this time, the digital signal RMEM_S held in the fourth memory 1204 is the digital signal based on the second pixel signal.

At a time T01c0, the control unit 102 sets the transfer control signal P_LTX to the high level. In response thereto, the digital signal WMEM held in the first memory 1201 of each column is transferred to and held in the second memory 1202 of each column as the digital signal LMEM.

At a time T01a2, the counter 108 starts counting, the reference signal generation unit 106 starts generating the reference signal VRAMP, and the analog-to-digital conversion unit 107 starts the analog-to-digital conversion on pixels in row 2 of the pixel unit 104. The output signal SIG_OUT used at this time is the signal (A) based on the photoelectric conversion portion 201 of the pixel unit 104. This signal is referred to as a third pixel signal.

At a time T01e1, the horizontal scanning unit 110 sets the readout control signal P_READ[1] in column 1 to the high level. In response thereto, the digital signal RMEM_N[1] held in the third memory 1203 is output to the output signal line HSCAN_OUT_N, and the digital signal RMEM_S [1] held in the fourth memory 1204 is output to the output signal line HSCAN_OUT_S. In a similar manner, in the subsequent time period until the time T01e2, the digital signal RMEM_N held in the third memory 1203 and the digital signal RMEM_S held in the fourth memory 1204 are output to the respective output signal lines. The digital signal RMEM_S held in the fourth memory 1204 read in this time period is the digital signal based on the second pixel signal.

At a time T01b1, the output signal SIG_OUT of the pixel P(1, 2) in column 1 of row 2 of the pixel unit 104 coincides with the reference signal VRAMP, and the comparison result signal P_LATCH[1] is output. At this time, the count value (A(P(1, 2))) at the time T01b1 is held in the first memory 1201 as the digital signal WMEM[1]. In a similar manner, the analog-to-digital conversion unit 107 also performs the analog-to-digital conversion on pixels in columns 2 to m of row 1.

At a time T01a3, the counter 108 ends counting, and the analog-to-digital conversion unit 107 ends the analog-to-digital conversion on all of the third pixel signals in row 2.

At a time T01a4, the counter 108 starts counting, the reference signal generation unit 106 starts generating the reference signal VRAMP, and the analog-to-digital conversion unit 107 starts the analog-to-digital conversion on pixels in row 2 of the pixel unit 104. The output signal SIG_OUT used at this time is the signal (A+B), which is the sum of the signal based on the photoelectric conversion portion 201 of the pixel unit 104 and the signal based on the photoelectric conversion portion 203 thereof. This signal is referred to as a fourth pixel signal.

At a time T01b2, the output signal SIG_OUT of the pixel P(1, 2) in column 1 of row 2 of the pixel unit 104 coincides with the reference signal VRAMP, and the comparison result signal P_LATCH[1] is output. At this time, the count value (A+B(P(1, 2))) at the time T01b2 is held in the first memory 1201 as the digital signal WMEM[1]. In a similar manner, the analog-to-digital conversion unit 107 also performs the analog-to-digital conversion on pixels in columns 2 to m of row 2.

At a time T01a5, the counter 108 ends counting, and the analog-to-digital conversion unit 107 ends the analog-to-digital conversion on all of the fourth pixel signals in row 2.

At a time T01d1, the control unit 102 sets the transfer control signal P_MTX_N to the high level. In response thereto, the digital signal LMEM held in the second memory 1202 of each column is transferred to and held in the third memory 1203 of each column as the digital signal RMEM_N.

At a time T01c1, the control unit 102 sets the transfer control signal P_LTX to the high level. In response thereto, the digital signal WMEM held in the first memory 1201 of each column is transferred to and held in the second memory 1202 of each column as the digital signal LMEM. At this time, the digital signal LMEM held in the second memory 1202 is the digital signal based on the fourth pixel signal.

At a time T01d2, the control unit 102 sets the transfer control signal P_MTX_S to the high level. In response thereto, the digital signal LMEM held in the second memory 1202 of each column is transferred to and held in the fourth memory 1204 of each column as the digital signal RMEM_S.

At a time T01e3, the horizontal scanning unit 110 sets the readout control signal P_READ[1] in column 1 to the high level. In response thereto, the digital signal RMEM_N[1] held in the third memory 1203 is output to the signal output unit 111 via the output signal line HSCAN_OUT_N, and the digital signal RMEM_S [1] held in the fourth memory 1204 is output thereto via the output signal line HSCAN_OUT_S. In a similar manner, in the subsequent time period until the time T02e0, the digital signal RMEM_N held in the third memory 1203 and the digital signal RMEM_S held in the fourth memory 1204 are output to the signal output unit 111. The digital signal RMEM_S, which is held in the fourth memory 1004 and read in this time period, is the digital signal based on the fourth pixel signal.

At a time T02, the CPU 101 instructs the control unit 102 to set the horizontal synchronization signal HD to the high level.

Subsequently, the operation between the time T00 and the time T01 and the operation between the time T01 and the time T02 are alternately performed.

According to the present exemplary embodiment, the first analog-to-digital conversion period indicates the time period between the time T00a2 and the time T00a3 and the time period between the time T01a2 and the time T01a3. In addition, the second analog-to-digital conversion period indicates the time period between the time T00a4 and the time T00a5 and the time period between the time T01a4 and the time T01a5. The first horizontal period indicates the time period between the time T00 and the time T01. The second horizontal period indicates the time period between the time T01 and the time T02.

Similarly to the first and the second exemplary embodiments, according to the present exemplary embodiment, the analog-to-digital conversion is also performed on output signals from pixels in pixel rows with which only the image forming signal is output from the memory unit 109. In other words, the analog-to-digital conversion is performed on output signals from all pixels of the pixel unit 102. Therefore, it is possible to reduce or eliminate the difference in charge accumulation time in the photoelectric conversion portion 201 for the image forming signal between a pixel row performing both focus detection and image formation and a pixel row performing only image formation. Therefore, the difference in luminance between rows of the pixel unit 102, i.e., level differences, can be reduced in the formed image, thus acquiring a smooth image.

According to the present exemplary embodiment, in row 1, both the digital signal corresponding to the first pixel signal based on the output of the photoelectric conversion portion 201 and the digital signal corresponding to the second pixel signal based on the outputs of the photoelectric conversion portions 201 and 203 are output from the fourth memory 504 to the signal output unit 111. On the other hand, in row 2, the digital signal corresponding to the fourth pixel signal based on the outputs of the photoelectric conversion portions 201 and 203 is output from the fourth memory 1204, but the digital signal corresponding to the third pixel signal based on the output of the photoelectric conversion portion 201 is not output. This means that the output of the digital signal based on the third pixel signal can be eliminated.

According to the present exemplary embodiment, at the time T00c1, the digital signal based on the second pixel signal is transferred to the second memory 1202. This makes it possible to delay the timing when the fourth memory 1204 holds the digital signal based on the second pixel signal and accordingly to delay the timing when the memory unit 109 starts outputting the digital signal based on the second pixel signal to the signal output unit 111. This allows the memory unit 109 to output the digital signal based on the second pixel signal in a time period produced by not outputting the digital signal based on the third pixel signal.

As a result, the time period between the time T00a5 and the time T01e1 is different from the time period between the time T01a5 and the time T01e3. At the time T00a5, the analog-to-digital conversion on the second pixel signal in row 1 is completed. At the time T01e1, the output of the digital signal based on the second pixel signal to the signal output unit 111 is started. At the time T01a5, the analog-to-digital conversion on the fourth pixel signal in row 2 is completed. At the time T01e3, the output of the digital signal based on the fourth pixel signal to the signal output unit 111 is started.

On the other hand, the interval at which the horizontal scanning unit 110 outputs the readout signal P_READ becomes constant in the time period between the start of the first horizontal period (T00) and the end of the second horizontal period (T02).

In this way, the present exemplary embodiment also makes it possible to output digital signals from the memory unit 109 to the signal output unit 111 at fixed intervals in two continuous horizontal periods. In other words, a time period produced by not outputting the digital signal based on the third pixel signal from the memory unit 109 to the output signal lines is allocated as a transfer time for other digital signals. Therefore, sufficient time can be used to transfer each piece of data even if there is a large number of data. This makes it possible not only to ensure reliability in digital signal transfer but also to restrict the increase in circuit scale.

Controlling the input order of the transfer control signals via the control unit 102 requires no selector, making it possible to restrict the increase in circuit scale to a further extent.

A fourth exemplary embodiment will be described below centering on differences from the first exemplary embodiment, and descriptions of portions having similar configurations, functions, and effects to those according to the first exemplary embodiment will be omitted.

<Column Circuit Unit>

Figure 12:
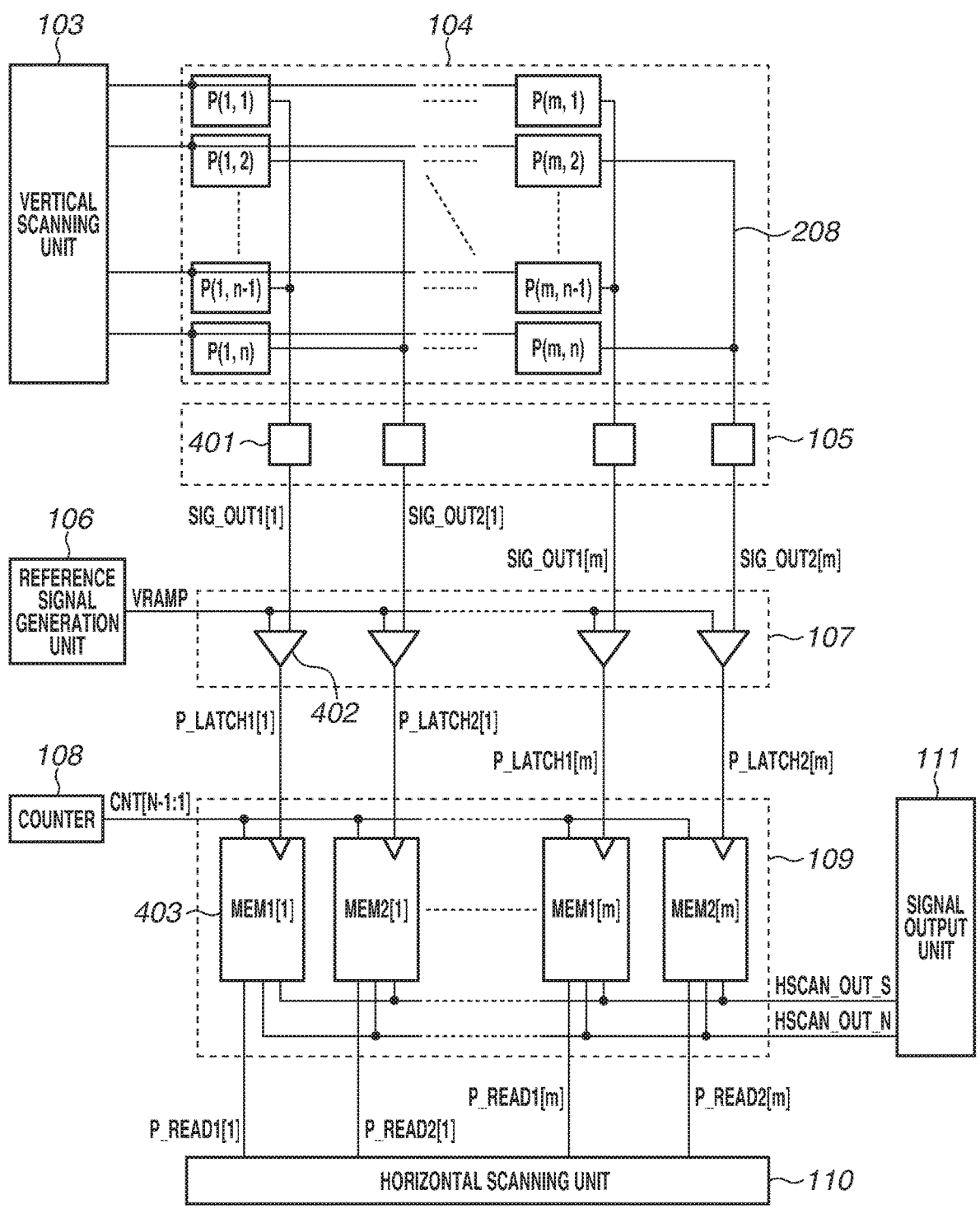
FIG. 12 illustrates a relationship in each column in a pixel unit, a readout circuit unit, an analog-to-digital conversion unit, and a memory unit according to a fourth exemplary embodiment.

FIG. 12 illustrates a relationship in each column between the pixel unit 104, the readout circuit unit 105, the analog-to-digital conversion unit 107, and the memory unit 109 according to the present exemplary embodiment.

The pixel unit 104 has two vertical output lines 208 for each pixel column. The vertical scanning unit 103 sequentially selects pixels P arranged in a matrix form every two rows. The simultaneously selected two rows are connected to different vertical output lines. The readout circuit 401, the comparison circuit 402, and the memory block 403 are provided for each vertical output line, and sequentially process the signals from each vertical output line. Referring to FIG. 12, the memory blocks 901 and 902 have a similar configuration.

<Driving Method>

Figure 13B:
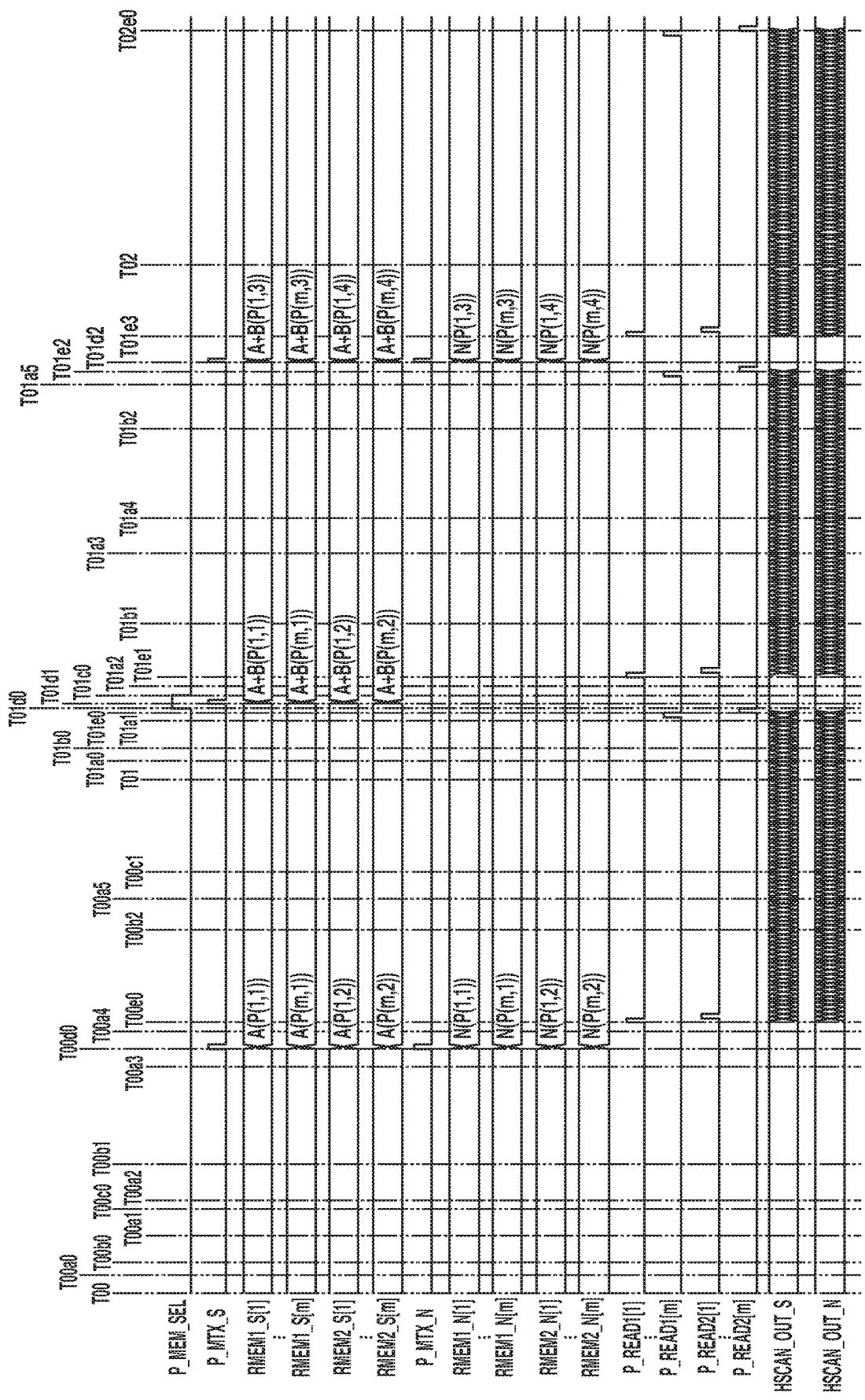
FIG. 13 (consisting of FIGS. 13A and 13B) is a timing chart illustrating an example of operations of the analog-to-digital conversion unit and the memory unit according to the fourth exemplary embodiment.

FIG. 13 (consisting of FIGS. 13A and 13B) is a timing chart illustrating an example of operations of the analog-to-digital conversion unit 107 and the memory unit 109 illustrated in FIG. 12.

In this driving method, the timings at which the control unit 102 outputs the horizontal synchronization signal HD, the transfer control signal P_LTX, the transfer control signal P_MTX_N, the transfer control signal P_MTX_S, and the selection signal P_MEM_SEL are similar to those of the first exemplary embodiment.

Although the first exemplary embodiment includes one signal line of the comparison result signal P_LATCH, one first memory 501, one second memory 502, one third memory 503, and one fourth memory 504 for each column, the present exemplary embodiment includes two of each component for each column. More specifically, the first memory 501, the second memory 502, the third memory 503, and the fourth memory 504 corresponding to the signal line of the comparison result signal P_LATCH1 hold the digital signals WMEM1, LMEM1, RMEM1_N, and RMEM1_S, respectively. In addition, the first memory 501, the second memory 502, the third memory 503, and the fourth memory 504 corresponding to the signal line of the comparison result signal P_LATCH2 hold the digital signals WMEM2, LMEM2, RMEM2_N, and RMEM2_S, respectively. Although, in FIG. 13, only the waveform of the output signal SIG_OUT1 is illustrated, the output signal SIG_OUT2 has a similar waveform.

According to the present exemplary embodiment, the first analog-to-digital conversion period indicates the time period between the time T00a2 and the time T00a3 and the time period between the time T01a2 and the time T01a3. In addition, the second analog-to-digital conversion period indicates the time period between the time T00a4 and the time T00a5 and the time period between the time T01a4 and the time T01a5. The first horizontal period indicates the time period between the time T00 and the time T01. The second horizontal period indicates the time period between the time T01 and the time T02.

Similarly to other exemplary embodiments, according to the present exemplary embodiment, the analog-to-digital conversion is also performed on output signals from pixels in pixel rows with which only the image forming signal is output from the memory unit 109. Therefore, it is possible to reduce or eliminate the difference in charge accumulation time in the photoelectric conversion portion 201 for the image forming signal between a pixel row performing both focus detection and image formation and a pixel row performing only image formation. Therefore, the difference in luminance between rows of the pixel unit 102, i.e., level differences, can be reduced in the formed image, thus acquiring a smooth image.

In row 1, both the digital signal corresponding to the first pixel signal based on the output from the photoelectric conversion portion 201 and the digital signal corresponding to the second pixel signal based on the outputs from the photoelectric conversion portions 201 and 203 are output from the fourth memory 504 to the signal output unit 111. On the other hand, in row 2, the digital signal corresponding to the fourth pixel signal based on the outputs of the photoelectric conversion portions 201 and 203 is output from the fourth memory 504, but the digital signal corresponding to the third pixel signal based on the output of the photoelectric conversion portion 201 is not output. Therefore, similar to the first exemplary embodiment, the output of the digital signal based on the third pixel signal can be eliminated.

At a time T00c1, the digital signal based on the second pixel signal is held in the second memory 502. This makes it possible to delay the timing when the fourth memory 504 holds the digital signal based on the second pixel signal and accordingly to delay the timing when the fourth memory 504 starts outputting the digital signal based on the second pixel signal. This allows the memory unit 109 to output the digital signal based on the second pixel signal in a time period produced by not outputting the digital signal based on the third pixel signal.

Therefore, the interval at which the horizontal scanning unit 110 outputs the readout signal P_READ becomes constant in the time period between the start of the first horizontal period (T00) and the end of the second horizontal period (T02).

A fifth exemplary embodiment will be described below centering on an imaging system having the solid-state imaging device according to any one of the first to the fourth exemplary embodiments, with reference to FIG. 14. Components similar to those of the solid-state imaging device according to the first to the fourth exemplary embodiments are assigned the same reference numerals and redundant descriptions thereof will be omitted or simplified. FIG. 14 is a block diagram illustrating an overall configuration of the imaging system according to the present exemplary embodiment.

The solid-state imaging device 100 according to any one of the first to the fourth exemplary embodiments is applicable to diverse types of imaging systems. Examples thereof applicable to imaging systems include digital still cameras, digital camcorders, monitoring cameras, copying machines, facsimile machines, mobile phones, car cameras, and observation satellites. Examples thereof applicable to imaging systems also include camera modules having an optical system such as a lens and a solid-state imaging device. FIG. 14 is a block diagram illustrating a digital still camera as an example of an imaging system.

An imaging system 1400 illustrated in FIG. 14 includes a solid-state imaging device 1401 and a lens 1402 for forming an optical image on the solid-state imaging device 1401. The imaging system 1400 further includes a diaphragm 1404 for varying the amount of light passing through the lens 1402, and a barrier 1406 for protecting the lens 1402. The lens 1402 and the diaphragm 1404 forms an optical system for condensing light to the solid-state imaging device 1401. The solid-state imaging device 1401 corresponds to the solid-state imaging device 100 according to any one of the first to the fourth exemplary embodiments and converts the optical image formed by the lens 1402 into imaged data.

The imaging system 1400 includes a signal processing unit 1408 for processing an output signal from the solid-state imaging device 1401. The signal processing unit 1408 performs analog-to-digital (A/D) conversion for converting an analog signal output from the solid-state imaging device 1401 into a digital signal. The signal processing unit 1408 performs other various corrections and compression processing as required and outputs image data. An A/D converter as a part of the signal processing unit 1408 may be formed on the semiconductor substrate on which the solid-state imaging device 1401 is disposed or on another semiconductor substrate different from the one for the solid-state imaging device 1401. The solid-state imaging device 1401 and the signal processing unit 1408 may be formed on the same semiconductor substrate.

The imaging system 1400 further includes a memory unit 1410 for temporarily storing image data, and an external interface (I/F) unit 1412 for communicating with an external computer. The imaging system 1400 further includes a recording medium 1414 such as a semiconductor memory for recording and reading imaging data, and a recording medium control I/F unit 1416 for performing recording and reading operations on the recording media 1414. The recording medium 1414 may be built in or configured to be attachable to and detachable from the imaging system 1400.

The imaging system 1400 further includes a general control/calculation unit 1418 for performing various calculations and controlling the entire digital still camera, and a timing generation unit 1420 for outputting various timing signals to the solid-state imaging device 1401 and the signal processing unit 1408. Timing signals may be input from the outside. In one embodiment, the imaging system 1400 includes at least the solid-state imaging device 1401, and the signal processing unit 1408 for processing output signals from the solid-state imaging device 1401.

The solid-state imaging device 1401 outputs an imaging signal to the signal processing unit 1408. The signal processing unit 1408 performs predetermined signal processing on the imaging signal output from the solid-state imaging device 1401 and outputs the processed image data. The signal processing unit 1408 performs image formation by using the imaging signal. For example, the signal processing unit 1408 performs focus detection by using digital signals based on the noise signal, the first pixel signal, and the second pixel signal from the solid-state imaging device 1401. In addition, the signal processing unit 1408 performs image formation by using digital signals based on the noise signal and the second or the fourth pixel signal from the solid-state imaging device 1401.

Applying the solid-state imaging device 100 according to any one of the first to the fourth exemplary embodiments enables achieving an imaging system capable of restricting the increase in circuit scale in the imaging system and performing reliable data transfer.

Figure 15A:
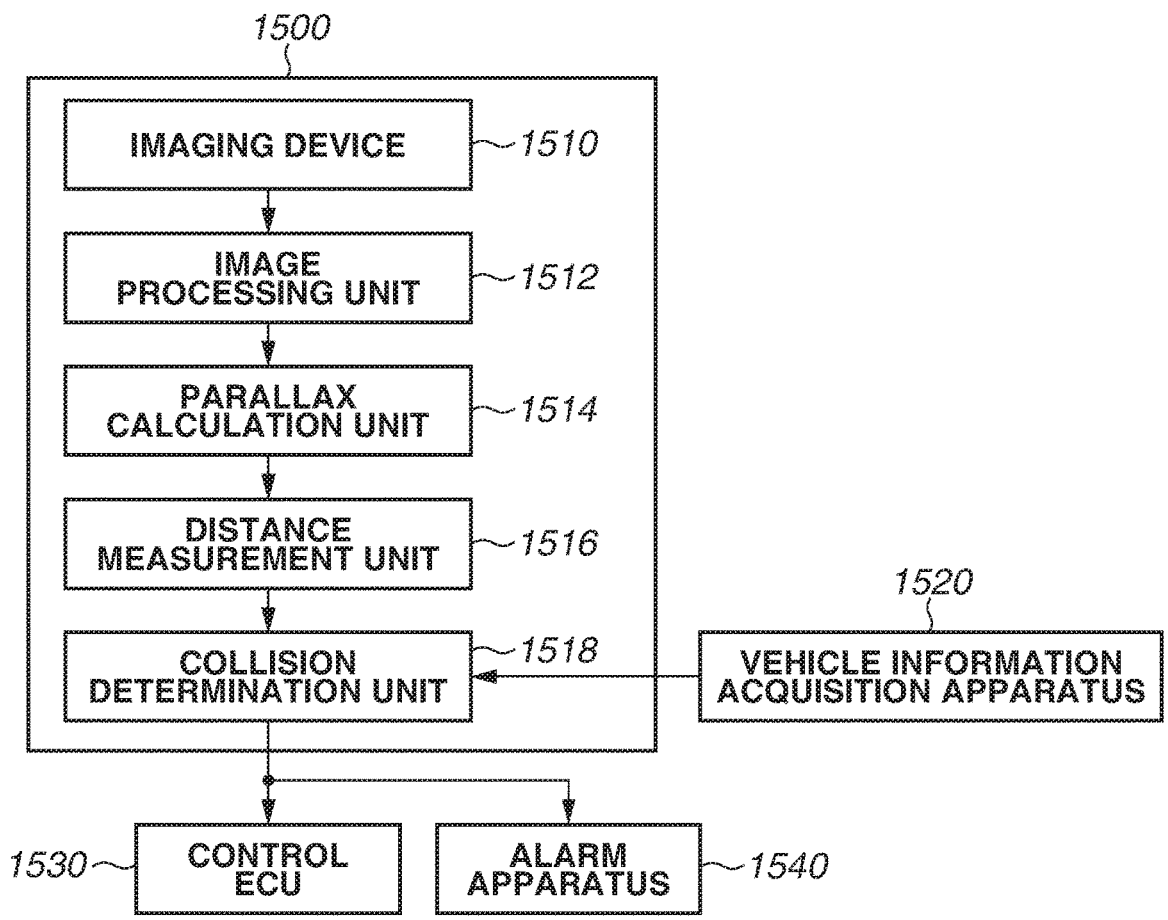
FIGS. 15A and 15B illustrate an imaging system and a moving body according to a sixth exemplary embodiment.
Figure 15B:
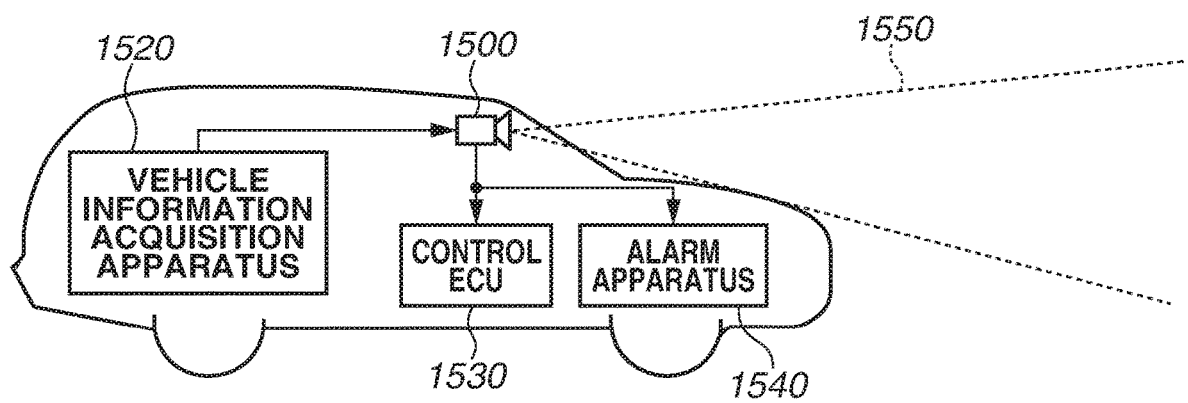

An imaging system and a moving body according to a sixth exemplary embodiment will be described below with reference to FIGS. 15A and 15B. FIGS. 15A and 15B illustrate configurations of the imaging system and the moving body according to the present exemplary embodiment.

FIG. 15A illustrates an example of the imaging system relating to an in-car camera. An imaging system 1500 includes a solid-state imaging device 1510. The solid-state imaging device 1510 corresponds to the solid-state imaging device 100 according to any one of the first to the fourth exemplary embodiments. The imaging system 1500 includes an image processing unit 1512 for performing image processing on a plurality of pieces of image data acquired from the solid-state imaging device 1510. The imaging system 1500 further includes a parallax calculation unit 1514 for calculating a parallax (phase difference of a parallax image) based on a plurality of pieces of image data acquired by the imaging system 1500. The imaging system 1500 further includes a distance measurement unit 1516 for calculating the distance to a subject based on the calculated parallax, and a collision determination unit 1518 for determining the collision possibility based on the calculated distance.

The parallax calculation unit 1514 and the distance measurement unit 1516 are an example of distance information acquisition unit for acquiring information about the distance to the subject. The distance information includes the parallax, the defocus amount, and the distance to the subject. The collision determination unit 1518 may determine the collision possibility by using these pieces of distance information. The distance information acquisition unit may be implemented by a specially designed hardware component or a software module. The distance information acquisition unit may also be implemented by a Field Programmable Gate Array (FPGA), an Application Specific Integrated circuit (ASIC), or a combination thereof.

The imaging system 1500 is connected with a vehicle information acquisition apparatus 1520 and can acquire vehicle information such as the vehicle speed, yaw rate, and rudder angle. The imaging system 1500 is connected with a control engine control unit (ECU) 1530 as a control apparatus for outputting control signals for generating a braking force for a vehicle based on a determination result by the collision determination unit 1518. The imaging system 1500 is also connected with an alarm apparatus 1540 for generating an alarm to a driver based on a determination result by the collision determination unit 1518.

For example, when the collision determination unit 1518 outputs a high collision possibility as a determination result, the control ECU 1530 performs vehicle control by applying the brakes, releasing the accelerator, and restricting the engine power to avoid collision and reduce damage. The alarm apparatus 1540 warns a user by generating a sound alarm, displaying alarm information on the screen of a car-navigation system, or giving a vibration to the seat belt or steering wheel.

According to the present exemplary embodiment, the imaging system 1500 captures the circumference of the vehicle such as the front and rear views of the vehicle. FIG. 15B illustrates an imaging system for capturing the front view of the vehicle (imaging range 1550). The vehicle information acquisition apparatus 1520 transmits an instruction to the imaging system 1500 or the solid-state imaging device 1510. This configuration enables improving the focusing accuracy.

The present exemplary embodiment has been described above centering on control for avoiding collision with other vehicles and is also applicable to automatic driving control for controlling a vehicle to follow another vehicle and automatic driving control for controlling the vehicle not to deviate from a lane. The imaging system is applicable not only to vehicles such as cars but also to moving bodies (moving apparatuses) such as vessels, airplanes, and industrial robots. In addition, the imaging system is applicable not only to moving bodies but also to apparatuses using a wide range of object recognitions, such as an intelligent transport system (ITS).

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-167254, filed Aug. 31, 2017, which is hereby incorporated by reference herein in its entirety.

What is claimed is:
1. A solid-state imaging device comprising:
a pixel unit including a plurality of pixels arranged in a matrix form, each of the pixels having a first photoelectric conversion portion and a second photoelectric conversion portion;
an analog-to-digital conversion unit configured to convert a first analog signal based on electric charge generated by the first photoelectric conversion portion into a first digital signal, convert, into a second digital signal, a second analog signal acquired by adding a signal based on electric charge generated by the first photoelectric conversion portion and a signal based on electric charge generated by the second photoelectric conversion portion, and convert a noise signal from each of the pixels into a third digital signal;
a memory unit configured to hold the first, the second, and the third digital signals; and an output signal line configured to output at least one of the first, the second, and the third digital signals held in the memory unit, wherein a first reading operation is performed on pixels in a first pixel row of the pixel unit, and a second reading operation is performed on pixels in a second pixel row read next to the first pixel row of the pixel unit, wherein, in the first reading operation, the first, the second, and the third digital signals are held from the analog-to-digital conversion unit to the memory unit and then output from the memory unit to the output signal line, and wherein, in the second reading operation, the first, the second, and the third digital signals are held from the analog-to-digital conversion unit to the memory unit, and then the second and the third digital signals are output from the memory unit to the output signal line while the first digital signal is not output.

2. The solid-state imaging device according to claim 1, wherein, in a first time period, the noise signal, the first analog signal, and the second analog signal of pixels in all columns of the first pixel row are subjected to analog-to-digital conversion into the third, the first, and the second digital signals, respectively, and wherein, in a second time period having a same length as the first time period, the noise signal, the first analog signal, and the second analog signal of pixels in all columns of the second pixel row are subjected to analog-to-digital conversion into the third, the first, and the second digital signals, respectively.

3. The solid-state imaging device according to claim 2, further comprising a scanning unit configured to supply, to the memory unit, a readout signal for controlling an output from the memory unit to the output signal line, wherein an interval at which the scanning unit outputs the readout signal is constant in a time period between a start of the first time period and an end of the second time period.

4. The solid-state imaging device according to claim 3, wherein, in the second time period, the first and the third digital signals held in the first time period are output to the output signal line, and the second digital signal held in the first time period and the third digital signal generated in the second time period are held.

5. The solid-state imaging device according to claim 1, wherein, while the first and the third digital signals of pixels in a plurality of columns of the first pixel row are being output to the output signal line, conversion of pixels in the second pixel row into the third digital signal is started.

6. The solid-state imaging device according to claim 1, wherein, while the second and the third digital signals of pixels in a plurality of columns of the first pixel row are being output to the output signal line, conversion of pixels in the second pixel row into the third digital signal is started.

7. The solid-state imaging device according to claim 1, further comprising a micro lens disposed so that light incident onto the first and the second photoelectric conversion portions passes through the micro lens.

8. An imaging system comprising:
the solid-state imaging device according to claim 1; and
a signal processing unit configured to process a signal output from each of the pixels of the solid-state imaging device.

9. An imaging system comprising:
the solid-state imaging device according to claim 1; and
a signal processing unit configured to perform focus detection by using the first, the second, and the third digital signals of the solid-state imaging device and perform image formation by using the second and the third digital signals.

10. A moving body comprising:
the solid-state imaging device according to claim 1; and
a distance information acquisition unit configured to acquire information about a distance to a subject from a parallax image based on signals from the solid-state imaging device.

11. An analog-to-digital converter comprising:
an analog-to-digital conversion unit configured to convert an analog signal from a pixel into a digital signal; and
a memory unit connected to the analog-to-digital conversion unit,
wherein the memory unit includes
a first memory having an input terminal connected with an output terminal of the analog-to-digital conversion unit;
a second memory having an input terminal connected with an output terminal of the first memory;
a third memory having an input terminal connected with an output terminal of the second memory and having an output terminal connected with a first output signal line;
a selection circuit having a first input terminal connected with the output terminal of the first memory and having a second input terminal connected with the output terminal of the second memory; and
a fourth memory having an input terminal connected with an output terminal of the selection circuit and having an output terminal connected with a second output signal line different from the first output signal line.

12. The analog-to-digital converter according to claim 11, further comprising a fifth memory connected between the first and the third memories.

13. A solid-state imaging device comprising:
pixels each having a first photoelectric conversion portion and a second photoelectric conversion portion;
a pixel unit including the pixels arranged in a matrix form; and
the analog-to-digital converter according to claim 11.

14. The solid-state imaging device according to claim 13, wherein the analog-to-digital convertor is configured to convert a first analog signal based on electric charge generated by the first photoelectric conversion portion into a first digital signal, convert, into a second digital signal, a second analog signal acquired by adding a signal based on electric charge generated by the first photoelectric conversion portion and a signal based on electric charge generated by the second photoelectric conversion portion, and convert a noise signal from each of the pixels into a third digital signal, wherein, in the analog-to-digital converter, the third, the first, and the second digital signals of pixels in all columns of a first pixel row of the pixel unit are generated in a first time period, and wherein, in the analog-to-digital converter, the third, the first, and the second digital signals of pixels in all columns of a second pixel row of the pixel unit are generated in a second time period following the first time period, the second time period having a same length as the first time period.

15. The solid-state imaging device according to claim 14, further comprising:
an output signal line configured to input an output from a memory unit; and a horizontal scanning unit configured to input, to the memory unit, a readout signal for controlling the output from the memory unit to the output signal line, wherein an interval at which the horizontal scanning unit outputs the readout signal is constant in a time period between a start of the first time period and an end of the second time period.

16. An analog-to-digital converter comprising:

an analog-to-digital conversion unit configured to convert an analog signal from a pixel into a digital signal; and a memory unit connected to the analog-to-digital conversion unit, wherein the memory unit includes a first memory having an input terminal connected with an output terminal of the analog-to-digital conversion unit;

a second memory having an input terminal connected with an output terminal of the first memory;

a third memory having an input terminal connected with an output terminal of the second memory and having an output terminal connected with a first output signal line; and a fourth memory having an input terminal connected with the output terminal of the second memory and having an output terminal connected with a second output signal line different from the first output signal line.

17. A solid-state imaging device comprising:

pixels each having a first photoelectric conversion portion and a second photoelectric conversion portion;

a pixel unit including the pixels arranged in a matrix form; and the analog-to-digital converter according to claim 16.

18. The solid-state imaging device according to claim 17, wherein the analog-to-digital convertor is configured to convert a first analog signal based on electric charge generated by the first photoelectric conversion portion into a first digital signal, convert, into a second digital signal, a second analog signal acquired by adding a signal based on electric charge generated by the first photoelectric conversion portion and a signal based on electric charge generated by the second photoelectric conversion portion, and convert a noise signal from each of the pixels into a third digital signal, wherein, in the analog-to-digital converter, the third, the first, and the second digital signals of pixels in all columns of a first pixel row of the pixel unit are generated in a first time period, and wherein, in the analog-to-digital converter, the third, the first, and the second digital signals of pixels in all columns of a second pixel row of the pixel unit are generated in a second time period following the first time period, the second time period having a same length as the first time period.

19. The solid-state imaging device according to claim 18, further comprising:

an output signal line configured to input an output from a memory unit; and a horizontal scanning unit configured to input, to the memory unit, a readout signal for controlling the output from the memory unit to the output signal line, wherein an interval at which the horizontal scanning unit outputs the readout signal is constant in a time period between a start of the first time period and an end of the second time period.

* * * * *